US012578809B2

(12) United States Patent
Christodoulou

(10) Patent No.: US 12,578,809 B2
(45) Date of Patent: Mar. 17, 2026

(54) INPUT DEVICE INCLUDING OPTICAL SENSOR

(71) Applicant: Apple Inc., Cupertino, CA (US)

(72) Inventor: Evangelos Christodoulou, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/595,139

(22) Filed: Mar. 4, 2024

(65) Prior Publication Data

US 2025/0278146 A1    Sep. 4, 2025

(51) Int. Cl.
| | |
|---|---|
| *G06F 3/0354* | (2013.01) |
| *G06F 3/01* | (2006.01) |
| *G06F 3/03* | (2006.01) |
| *G06F 3/0346* | (2013.01) |

(52) U.S. Cl.
CPC .......... *G06F 3/03545* (2013.01); *G06F 3/016* (2013.01); *G06F 3/017* (2013.01); *G06F 3/0304* (2013.01); *G06F 3/0346* (2013.01)

(58) Field of Classification Search
CPC ...... G06F 3/03545; G06F 3/016; G06F 3/017; G06F 3/0304; G06F 3/0346
See application file for complete search history.

(56) References Cited

U.S. PATENT DOCUMENTS

| | | | |
|---|---|---|---|
| 9,329,703 | B2 | 5/2016 | Falkenburg et al. |
| 11,614,806 | B1 | 3/2023 | Cihan et al. |

| | | | | |
|---|---|---|---|---|
| 12,105,899 | B1 * | 10/2024 | Lin ........................ | G06F 3/0383 |
| 2008/0055279 | A1 * | 3/2008 | Osada .................. | G06F 3/03545 |
| | | | | 345/179 |
| 2009/0115744 | A1 * | 5/2009 | Zhang ................... | G06F 3/0346 |
| | | | | 345/179 |
| 2013/0257777 | A1 * | 10/2013 | Benko ................... | G06F 3/0383 |
| | | | | 345/173 |
| 2015/0169056 | A1 * | 6/2015 | Weddle ..................... | G06T 7/90 |
| | | | | 345/173 |
| 2015/0293612 | A1 * | 10/2015 | Chang ................... | G06F 3/0386 |
| | | | | 345/158 |
| 2019/0155411 | A1 * | 5/2019 | Kinrot ................... | G06F 3/0383 |
| 2022/0413636 | A1 * | 12/2022 | Lu ............................. | G01J 3/50 |
| 2023/0081403 | A1 * | 3/2023 | Pelissier ................. | G06F 3/016 |
| | | | | 345/177 |
| 2023/0229247 | A1 * | 7/2023 | Maidanchuk ......... | G06F 3/0386 |
| | | | | 345/179 |
| 2024/0004483 | A1 | 1/2024 | Whitney et al. | |
| 2025/0053250 | A1 * | 2/2025 | Yoshitomi ............... | G06F 3/016 |

* cited by examiner

*Primary Examiner* — Md Saiful A Siddiqui
(74) *Attorney, Agent, or Firm* — Dorsey & Whitney LLP

(57) ABSTRACT

Input devices for electronic devices and systems that include input devices in communication with electronic devices are disclosed. In an example, an input device includes a housing that includes an elongate body and a tip coupled with the elongate body. The input device further includes an optical flow sensor disposed in the tip of the housing. The optical flow sensor is configured to detect two-dimensional movement of the input device relative to a surface. Additional information about the position of the input device can be determined using various sensors and emitters of the input device and a computing system connected to the input device.

17 Claims, 7 Drawing Sheets

1100

INPUT DEVICE INCLUDING OPTICAL SENSOR

FIELD

The present disclosure relates generally to user input devices and systems. More particularly, the present disclosure relates to two-dimensional and three-dimensional input device tracking systems and devices.

BACKGROUND

Many types of input devices are presently available for performing operations in a computing system, such as buttons or keys, mice, trackballs, joysticks, touch panels, touch screens, and the like. Touch-sensitive devices, and touch screens in particular, are quite popular because of their ease and versatility of operation as well as their affordable prices. A touch-sensitive device can include a touch panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch-sensitive device can allow a user to perform various functions by touching or hovering over the touch panel using a finger, stylus or other object at a location often dictated by a user interface (UI) being displayed by the display device. The touch-sensitive device can recognize a touch or hover event and the position of the event on the touch panel, and the computing system can then interpret the event in accordance with the interface shown at the time of the event. Thereafter, the device can perform one or more actions based on the event.

Styli have become popular input devices for touch-sensitive devices. In particular, use of an active stylus capable of generating electronic stylus stimulation signals that can be sensed by the touch-sensitive device can improve the precision of stylus input. However, such styli require a touch-sensitive surface in order to generate content. There is a constant need for improvements to user interfaces and input devices.

SUMMARY

In at least one example of the present disclosure, an input device includes a housing including an elongate body and a tip portion coupled with the elongate body, and an optical flow sensor disposed in the tip portion. The optical flow sensor can be configured to detect two-dimensional movement of the input device relative to a surface.

In some examples, the optical flow sensor can be disposed at a radial center of the elongate body. The input device can further include a transparent spacer disposed between the optical flow sensor and a tip of the tip portion.

In some examples, the optical flow sensor can be disposed in an opening in the tip portion radially offset from a radial center of the elongate body. The input device can further include a light emitter disposed in the tip portion adjacent to the optical flow sensor.

In some examples, the input device can further include a force sensor disposed at a tip of the tip portion. The input device can further include an ultrasonic sensor configured to detect a distance between the input device and an object. In some examples, the input device can further include an inertial measurement unit (IMU) configured to detect an orientation of the input device.

In at least one example of the present disclosure, a system includes an input device including a first sensor and a first electronic component, and a computing device in electronic communication with the input device. The first sensor can be configured to detect a position of the input device relative to a surface in at least two dimensions and to produce a first signal based on the position. The first electronic component can be configured to detect an additional characteristic of the position of the input device and to produce a second signal based on the additional characteristic. The computing device can include a processor configured to perform an action based on a combination of the first signal and the second signal.

In some examples, the input device can further include a microcontroller coupled to the first sensor and the first electronic component. The microcontroller can be configured to produce a third signal based on the combination of the first signal and the second signal. The processor can be configured to perform the action based on the third signal.

In some examples, the first sensor can be an optical flow sensor. In some examples, the first electronic component can include an ultrasonic sensor and the additional characteristic can be a distance from the surface or the computing device. In some examples, the first electronic component can include a force sensor and the additional characteristic can be a state of contact of the input device with the surface.

The first electronic component can include an inertial measurement unit (IMU) and the additional characteristic can be a roll of the input device. The input device can further include a haptic feedback device. The processor can be configured to output a command to the haptic feedback device based on the second signal.

In some examples, the first electronic component can include an inertial measurement unit (IMU) and the additional characteristic can be at least one of: a pitch displacement, a pitch angle, a yaw displacement, a yaw angle, a roll displacement, or a roll angle. The processor can be configured to perform gesture tracking for the input device based on the additional characteristic.

In at least one example of the present disclosure, a computing device includes a processor and a memory in electronic communication with the processor. The memory includes electronic instructions encoded thereon which, when executed by the processor, cause the processor to perform a method including collecting two-dimensional position data for an input device from an optical flow sensor of the input device, collecting additional position data for the input device from a second sensor, combining the two-dimensional position data and the additional position data to produce aggregate position data, and performing an action based on the aggregate position data.

In some examples, the two-dimensional position data can include detected movement of the input device relative to a tracking surface. The additional position data can include detected distance from the second sensor to the tracking surface. Combining the two-dimensional position data and the additional position data can include correcting the detected movement based on the detected distance to produce the aggregate position data.

In some examples, the additional position data can include at least one of a roll of the input device, a tilt of the input device, a gesture performed with the input device, a three-dimensional position of the input device, or a state of contact of the input device with a surface.

In some examples, the action can include modifying a visual user interface element displayed by a display of the computing device.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
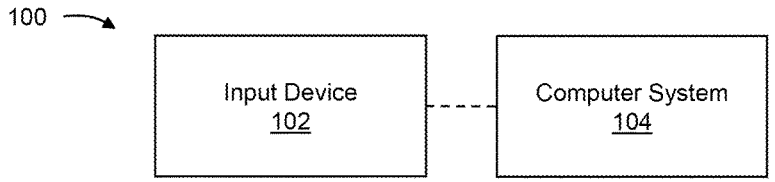
FIG. 1 shows a block diagram of an input device coupled with a computing system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

As used herein, the term "optical flow" refers to apparent motion of a surface, object, or other visual scene relative to an observer caused by relative motion between the observer and the scene. An "optical flow sensor" can include an image sensor and can determine relative motion between the image sensor and a scene by detecting landmarks in the scene and comparing positions of those landmarks between frames. The optical flow sensor can generate a signal that reflects the motion of the image sensor relative to the scene in two dimensions.

The following disclosure relates generally to input devices for electronic devices. More particularly, the present disclosure relates to input devices and systems that include input devices and electronic devices that include improved spatial tracking. Sensors can be included in an input device and/or an electronic device in electronic communication with the input device for detecting and tracking two-dimensional movement of the input device relative to a surface, a three-dimensional position and movement of the input device (e.g., relative to the electronic device, relative to the surface, or the like), other position and movement of the input device (e.g., a roll, a tilt, and the like of the input device), other characteristics of the input device (e.g., contact with the surface, actions performed with or on the input device, or the like), and the like. The input devices with improved spatial tracking can be used on passive surfaces, can be used to perform a greater number of commands through the input devices (e.g., based on additional tracked dimensions and characteristics of the input devices), can be used to provide commands through the input devices with greater fidelity and accuracy, and the like.

In some examples, the sensors can include an optical flow sensor in the input device, which can be used to detect two-dimensional movement of the input device relative to a surface. In some examples, the sensors can include ultrasonic sensors (e.g., ultrasonic speakers, ultrasonic microphones, and/or ultrasonic transceivers) in the input device and/or the electronic device, which can be used to detect and track three-dimensional movement and positions of the input device relative to the electronic device and the surface. In some examples, the sensors can include an inertial measurement unit in the input device, which can be used to detect and track translational or displacement movement, roll, tilt, and the like of the input device. Signals from any of these sensors can be combined with one another to provide improved spatial detection and tracking of the input device, to perform a greater number of commands through input from the input device to the electronic device, to provide commands through the input from the input device to the electronic device with greater fidelity and accuracy, and the like. Because the input device can be used with passive surfaces, the input device can be used as an input device for electronic devices that include touch-sensitive surfaces (e.g., a tablet computer, a cellular phone, a computer, a watch, or the like), as well as electronic devices that do not include touch-sensitive surfaces (e.g., a portable or digital media player, a GPS unit, a remote control device, or the like).

These and other embodiments are discussed below with reference to FIGS. 1 through 11. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 shows a block diagram of a system 100 that can be used to implement embodiments of the present disclosure. The system 100 includes an input device 102 (described below in detail with respect to FIG. 2) in electrical communication with a computing system 104 (described below in detail with respect to FIG. 3 and also referred to an electronic device or a computing device). The input device 102 and the computing system 104 can be in electrical communication with one another through a network interface of the input device 102 and a network interface of the computing system 200. Various sensors can be included in the input device 102 and/or the computing system 104 for detecting and tracking characteristics of the input device 102 and performing commands or actions with the computing system 104 based on the tracked characteristics of the input device 102.

The detected and tracked characteristics of the input device 102 can include two-dimensional movement of the input device 102 relative to a surface, three-dimensional movement of the input device 102 relative to surroundings of the input device 102, three-dimensional position and movement of the input device 102 relative to the computing system 104, additional-dimensional position and movement (e.g., pitch and pitch angle, yaw and yaw angle, roll and roll angle, and the like) of the input device 102 relative to the computing system 104, absolute additional-dimensional position and movement of the input device 102, other characteristics of the input device 102 (e.g., contact with the surface, actions performed with or on the input device, or the like), and the like. In some embodiments, the two-dimensional movement of the input device 102 relative to a surface can be detected by an optical flow sensor of the input device 102. Three-dimensional movement of the input device 102 relative to surroundings of the input device 102 can be detected by ultrasonic transceivers or optical sensors of the input device 102. The three-dimensional position and movement and the additional-dimensional position and movement of the input device 102 relative to the computing system 104 can be detected by optical sensors (e.g., cameras) of the computing system 104, ultrasonic transceivers of the input device 102 and/or the computing system 104, other sensors of the computing system 104 (e.g., electric field detectors), and the like. In some embodiments, the absolute additional-dimensional position and movement of the input device 102 can be detected by an inertial measurement unit of the input device 102. Other characteristics of the input device 102 can include contact of the input device 102 with a surface (e.g., based on a force sensor of the input device 102), performance of a gesture with the input device 102 (e.g., based on the inertial measurement unit of the input device 102; the optical sensors, ultrasonic transceivers, or other sensors of the input device 102 and/or the computing system 104; or the like), a button on the input device 102 being pressed, and the like.

Each of the sensors used to detect the tracked characteristics of the input device 102 can transduce various phenomena regarding the detected or tracked characteristics and convert those phenomena to electrical signals. The electrical signals from each of the sensors can be compared to and combined with one another in various ways to provide more accurate tracking of the input device 102, depending on where the input device 102 is located, depending on what commands or actions are being performed on the computing system 104 based on the tracked characteristics, depending on what applications are being used on the computing system 104, and the like. Thus, the sensors can be used to provide improved spatial tracking for the input device 102. For example, two-dimensional motion of the input device 102 can be detected by a capacitive touch, resistance, or force sensor of the computing system 104 when the input device 102 contacts a display of the computing system 104; by a capacitance sensor or electric field detector of the computing system 104 when the input device 102 is located near the display of the computing system 104; by an optical flow sensor of the input device 102 when the input device 102 is spaced away from the display of the computing system 104; and/or by ultrasonic transceivers or optical sensors of the computing system 104 when the input device 102 is positioned spaced away from the display of the computing system 104 or another surface.

The optical flow sensor of the input device 102 can detect motion of the input device 102 relative to a surface (referred to as a tracking surface) in two dimensions with high fidelity, and relative to a broad range of surfaces (e.g., active and/or passive surfaces). By combining the optical flow sensor of the input device 102 with other sensors of the input device 102 and the computing system 104, a broad range of commands and actions can be performed on the computing system 104 based on characteristics of the input device 102 in a broad range of circumstances (e.g., at different relative distances between the input device 102 and the computing system 104, other surrounding surfaces, and the like).

Figure 2:
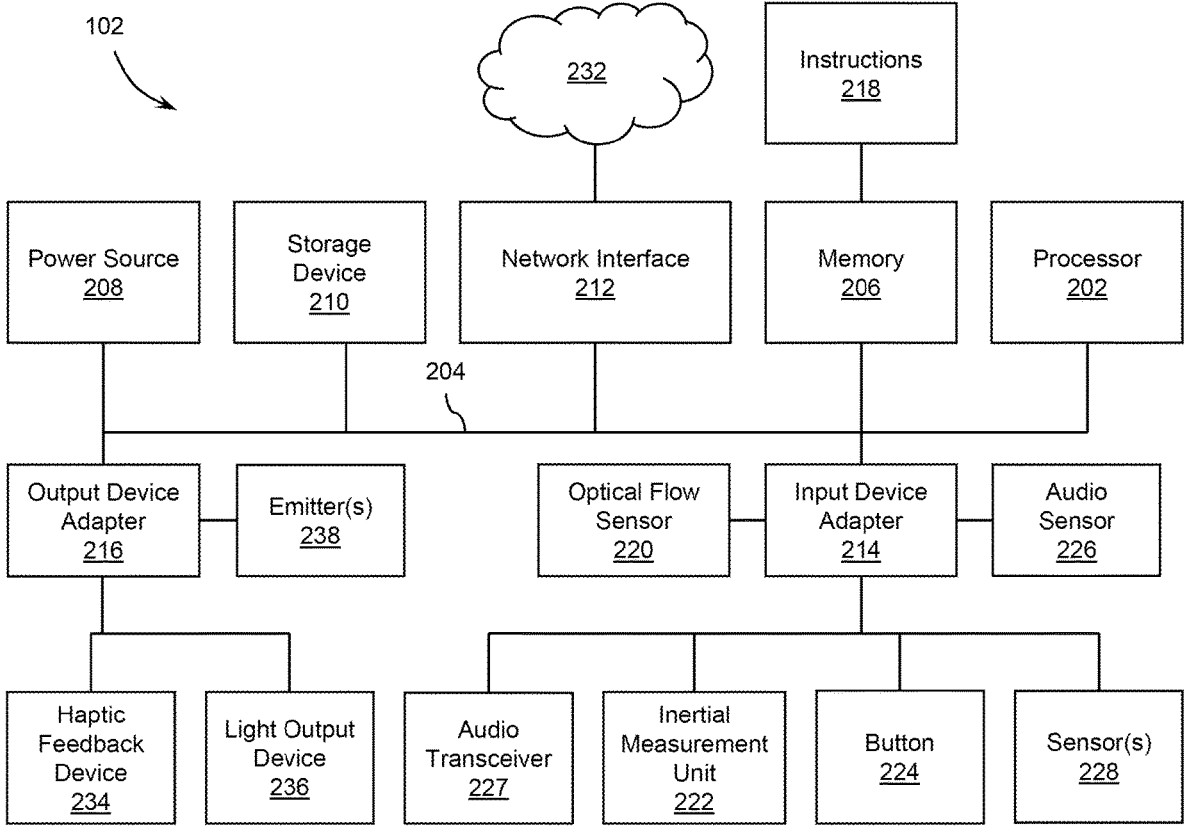
FIG. 2 shows a block diagram of an input device.
Figure 3:
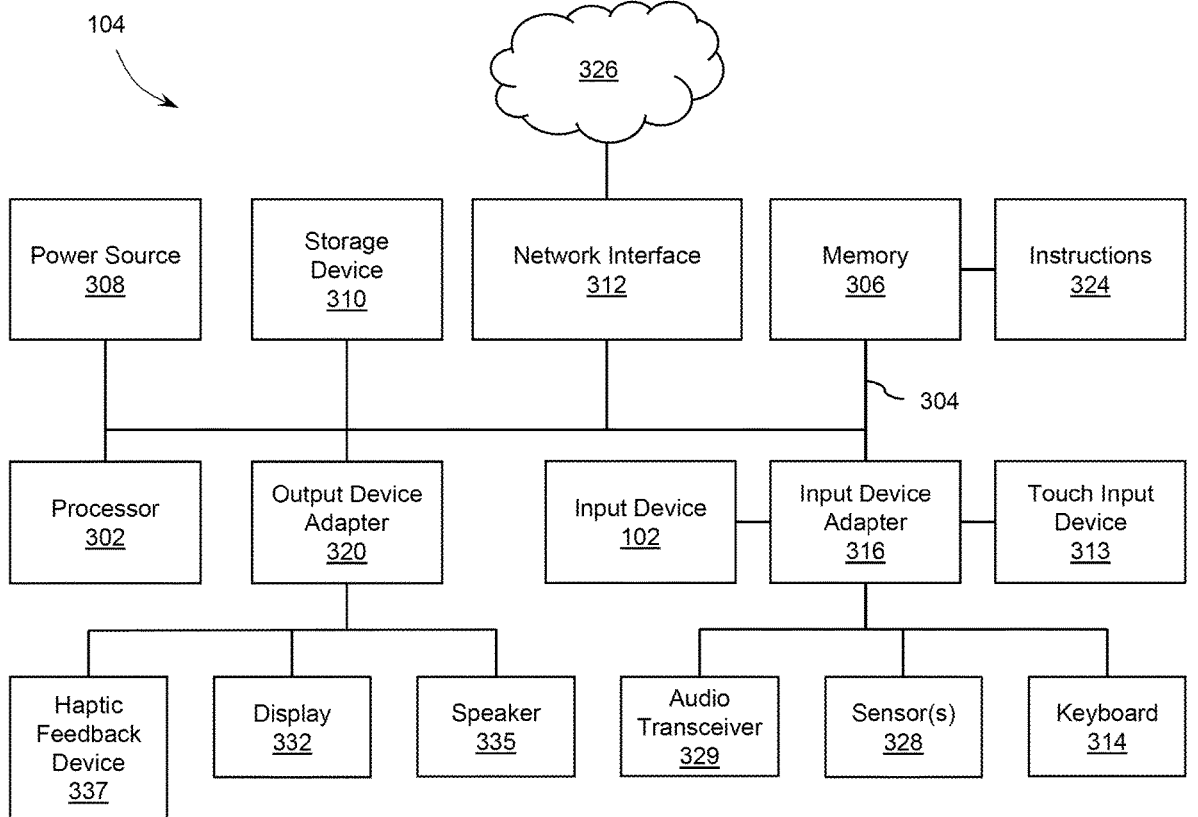
FIG. 3 shows a block diagram of a computing system.

As used herein, parts in "electrical communication" with each other are configured to exchange electrical signals, directly or indirectly, between each other, whether unidirectionally or bidirectionally. An input device (e.g., the input device 102) can be said to be in electrical communication with computing system (e.g., the computing system 104) if the computing system is using signals generated by the input device or if the computing system is using signals reliant upon or derived at least in part on the signals generated by the input device. For example, the input device 102 can be in electrical communication with the computing system 104 via a network interface (e.g., a network interface 212, discussed below with respect to FIG. 2, or a similar component) of the input device 102 and a network interface (e.g., a network interface 312, discussed below with respect to FIG. 3, or a similar component) of the computing system 104, as indicated in FIGS. 1 through 3 and described in further detail below. Similarly, a sensor (e.g., an optical flow sensor 220, an inertial measurement unit (IMU) 222, a button 224, an audio sensor 226, an audio transceiver 227, sensors 228, and the like, discussed below with respect to FIG. 2) can be said to be in electrical communication with a processor or controller device (e.g., a processor 202, discussed below with respect to FIG. 2) if the processor is using signals generated by the sensor or if the processor is using signals reliant upon or derived at least in part on the signals generated by the sensor. For example, the sensor can be in electrical communication with the processor via an input device adapter (e.g., an input device adapter 214, discussed below with respect to FIG. 2, or similar component) and an electrical communications bus (e.g., a bus 204, discussed below with respect to FIG. 2, or similar component), as indicated in FIG. 2 and described in further detail below.

FIG. 2 shows a block diagram of the input device 102 that can be used to implement embodiments of the present disclosure. The input device 102 is discussed herein in the context of a stylus; however, the input device 102 can correspond to or be incorporated in any form of input device, such as a mouse, a trackball, a joystick, a pointing device, a wand, a baton, a controller (e.g., a game controller), or the like. In various embodiments, the input device 102 can include various sets and subsets of the components shown in FIG. 2. Thus, FIG. 2 shows a variety of components that can be included in various combinations and subsets based on the operations and functions performed by the input device 102 in different embodiments. For example, the input device 102 can be part of the system 100; systems 600, 700, 800, 900, 1000, described below with respect to FIGS. 3, 6, 7, 8, 9, and 10, respectively; can be embodied in input devices 400, 500, described below with respect to FIGS. 4A through 5, respectively; and can be used for method 1100, described below with respect to FIG. 11. It is noted that, when described or recited herein, the use of the articles such as "a" or "an" is not considered to be limiting to only one, but instead is intended to mean one or more unless otherwise specifically noted herein.

The input device 102 can include a central processing unit (CPU) or processor 202 connected via a bus 204 for electrical communication to a memory 206, a power source 208, an electronic storage device 210, a network interface 212, an input device adapter 214, and an output device adapter 216. For example, one or more of these components can be connected to each other via a substrate (e.g., a printed circuit board or other substrate) supporting the bus 204 and other electrical connectors providing electrical communication between the components. The bus 204 can include a communication mechanism for communicating information between parts of the input device 102.

The processor 202 can be a microprocessor or similar device configured to receive and execute a set of instructions 218 stored by the memory 206. The memory 206 can be referred to as a main memory, such as a random access memory (RAM) or another dynamic electronic storage device for storing information and instructions to be executed by the processor 202. The memory 206 can also be used for storing temporary variables or other intermediate information during execution of instructions executed by the processor 202. The processor 202 can include one or more processors or controllers, such as, for example, a CPU for the input device 102 in general and an optical flow processor or similar processor used for controlling and receiving signals from an optical flow sensor 220 and any other sensors being used (e.g., an inertial measurement unit (IMU) 222, a button 224, an audio sensor 226, an audio transceiver 227, sensors 228, and the like). The power source 208 can include a power supply capable of providing power to the processor 202 and other components connected to the bus 204, such as a connection to an electrical utility grid or a battery system.

The storage device 210 can include a read-only memory (ROM) or another type of static storage device coupled to the bus 204 for storing static or long-term (i.e., non-dynamic) information and instructions for the processor 202. For example, the storage device 210 can include a magnetic or optical disk (e.g., a hard disk drive (HDD)), a solid state memory (e.g., a solid state disk (SSD)), or a comparable device.

The instructions 218 can include information for executing processes and methods using components of the input device 102. Such processes and methods can include, for example, the methods described in connection with other embodiments elsewhere herein. The instructions 218 can include performing method 1100, discussed below with respect to FIG. 11, performing commands or actions with systems 600, 700, 800, 900, 1000, discussed below with respect to FIGS. 6 through 10, and the like. The instructions 218 can include any methods for tracking a position and other characteristics of the input device 102 and performing actions or commands on the computing system 104 in response to inputs from the input device 102.

The network interface 212 can include an adapter for connecting the input device 102 to an external device via a wired or wireless connection. For example, the network interface 212 can provide a connection to a computer network 232 such as a cellular network, the Internet, a local area network (LAN), a separate device capable of wireless communication with the network interface 212 (e.g., the computing system 104), other external devices or network locations, and combinations thereof. In one example embodiment, the network interface 212 is a wireless networking adapter configured to connect via WI-FI®, BLUETOOTH®, BLE, Bluetooth mesh, or a related wireless communications protocol to another device having interface capability using the same protocol. In some embodiments, a network device, a set of network devices, or components of a network device (e.g., sensors, processors, or the like) in the network 232 can be considered part of the input device 102. In some cases, a network device can be considered connected to, but not a part of, the input device 102.

The input device adapter 214 can be configured to provide the input device 102 with connectivity to various input devices, components, or sensors such as, for example, the optical flow sensor 220, the IMU 222, the button 224, the audio sensor 226, the audio transceiver 227, the sensors 228, related devices, and combinations thereof. In some examples, the input device adapter 214 is connected to the optical flow sensor 220 to detect motion of the input device 102 relative to a tracking surface. The various sensors connected to the input device adapter 214, including the sensors 228, can be used to detect physical phenomena in the vicinity of the input device 102 (e.g., light, sound waves, electric fields, magnetic fields, forces, vibrations, ultrasonic transmissions, movement, position, and the like) and convert those phenomena to electrical signals. The optical flow sensor 220, the IMU 222, the button 224, the audio sensor 226, the audio transceiver 227, the sensors 228, and any other input devices, sensors, or components (e.g., buttons or switches) connected to the input device adapter 214 can be used to provide user input such as input regarding actions to be performed by the input device 102, settings of the input device 102, and the like. In some embodiments, the input device adapter 214 can be connected to a computing system (e.g., the computing system 104) or another electronic device, whether by a wired connection or by a wireless connection (e.g., via the network interface 212) to transmit input via the input device 102.

The optical flow sensor 220 can be configured to detect movement of the input device 102 relative to a tracking surface. In some examples, the optical flow sensor 220 can be disposed in a tip portion, a desktop surface-contacting or tracking surface-facing end portion, or the like of the input device 102. The optical flow sensor 220 can be configured to detect movement of the tip of the input device 102 relative to a substantially flat tracking surface against which the tip of the input device 102 is configured to contact, tap, slide, or drag. The optical flow sensor 220 can be further configured to detect movement of the tip of the input device 102 relative to non-flat tracking surfaces (e.g., curved surfaces, textured surfaces, other varying surfaces, and the like), and relative to tracking surfaces when the tip is spaced apart from the tracking surfaces. The optical flow sensor 220 can detect the movement of the input device 102 relative to the tracking surface in two dimensions, such as in an x-direction and a perpendicularly-oriented y-direction, and can detect the movement of the input device 102 relative to any starting point.

The optical flow sensor 220 can include an optical sensor, a light detector, an image sensor, or the like. For example, the optical flow sensor 220 can include a photodiode array, a complementary metal oxide semiconductor (CMOS) image sensor, a single photon avalanche detector (SPAD) array, an RGB sensor, a color sensor, another camera, or the like. The optical flow sensor 220 can detect landmarks on a tracking surface and compare those landmarks between frames in order to determine movement of the optical flow sensor 220 relative to the tracking surface. The optical flow sensor 220 can detect the landmarks based on RGB information, color information, or the like, and can compare pixels from images taken at different time in order to determine the movement of the optical flow sensor 220 relative to the tracking surface. In some examples, the output of the optical flow sensor 220 can include x-direction and y-direction movement, without other data.

The optical flow sensor 220 can have high fidelity and sensitivity, such as a sensing capability of about 20,000 dots per inch (dpi), up to about 20,000 dpi, up to about 15,000 dpi, up to about 12,000 dpi, up to about 10,000 dpi, or the like. The optical flow sensor 220 can be used to detect very small movements of the input device 102 relative to a tracking surface with high accuracy. The motion data generated by the optical flow sensor 220 can be converted to an electrical signal (referred to as a relative motion signal) and combined with data from the other sensors of the input device 102 and/or the computing system 104 in order to more accurately track the position and movement of the input device 102 and to provide improved spatial tracking of the input device 102.

The optical flow sensor 220 may detect x-direction and y-direction movement of the input device 102, and the detected motion of the input device 102 relative to a tracking surface may vary based on a distance from the optical flow sensor 220 to the tracking surface. For example, the optical flow sensor 220 may register a 1 centimeter (cm) absolute movement relative to a tracking surface as a 1 cm detected movement when the optical flow sensor 220 is spaced 1 cm from the tracking surface, but the optical flow sensor 220 may register the 1 cm absolute movement relative to the tracking surface as a 0.5 cm detected movement when the optical flow sensor is spaced 2 cm from the tracking surface. The signals from the optical flow sensor 220 can be combined with signals from other sensors of the input device 102 and/or the computing system 104 to compensate or correct for this variation in the detected movement of the optical flow sensor 220 relative to the tracking surface so that the absolute movement of the input device 102 can be calculated using a set of sensor signals.

The detected movement of the optical flow sensor 220 relative to a tracking surface may also vary based on an angle of the optical flow sensor 220 relative to the tracking surface. For example, the optical flow sensor 220 may register a 1 cm absolute movement relative to a tracking surface as a 1 cm detected movement when the optical flow sensor 220 is perpendicular to the surface, but the optical flow sensor 220 may register the 1 cm absolute movement relative to the tracking surface as a 2 cm detected movement when the optical flow sensor 220 is at an 45° angle to the tracking surface or when the angle of the optical flow sensor 220 relative to the tracking surface changes during the movement. The signals from the optical flow sensor 220 can be combined with signals from other sensors of the input device 102 and/or the computing system 104 to compensate or correct for this variation in the detected movement of the optical flow sensor 220 relative to the tracking surface so that the absolute movement of the input device 102 can be calculated using a set of sensor signals.

The input device 102 can include a light emitter, such as a light-emitting diode (LED), a laser diode, or the like, which can illuminate a tracking surface for detection with the optical flow sensor 220. The light emitter can emit various wavelengths of light, such as visible light, infrared light, or the like. The light emitter can be disposed adjacent to the optical flow sensor 220, such as in a tip portion, a desktop surface-contacting or tracking surface-facing end portion, or the like of the input device 102. However, the optical flow sensor 220 can operate in ambient light conditions, and a light emitter can be optionally omitted from the input device 102.

The optical flow sensor 220 can include a focal length and a field of view that are configured to perform two-dimensional motion detection for the input device 102 at a variety of distances from a tracking surface. For example, the optical flow sensor 220 can be configured to perform two-dimensional motion detection for the input device 102 at a range of distances from a tracking surface depending on a minimum and maximum focal distance. The minimum focal distance for the optical flow sensor 220 can be configured to be equal to (or less than) a distance between the optical flow sensor 220 and a tracking surface when a tip of the input device 102 contacts the tracking surface. The optical flow sensor 220 can be spaced apart from the tip of the input device 102 so that the optical flow sensor 220 is separated from a tracking surface by at least the minimum focal distance when the tip of the input device 102 touches the tracking surface. The minimum focal distance can be about 1 mm, about 2 mm, about 4 mm, about 6 mm, about 8 mm, about 10 mm, or the like. The maximum focal distance for the optical flow sensor 220 can be up to about 1 m, up to about 50 cm, up to about 30 cm, up to about 20 cm, up to about 15 cm, up to about 10 cm, or the like. Thus, the optical flow sensor 220 can be configured to provide two-dimensional motion detection for the input device 102 when the input device 102 is located within a range of distances from a tracking surface, such as a range extending between a position where the input device 102 is physically contacting the tracking surface up to a position where the input device 102 is spaced away from the tracking surface by about 1 meter (m), about 50 cm, about 30 cm, about 20 cm, about 15 cm, or about 10 cm.

In some examples, the optical flow sensor 220 can be configured to pause two-dimensional motion detection for the input device 102 when certain conditions are met. For example, the detection of the optical flow sensor 220 can be paused or filtered from a signal stream of the input device 102 when an overly fast or large movement of the input device 102 is detected, when a tracking surface detected by the optical flow sensor 220 changes (e.g., moving from a tracking surface with one surface material or appearance to another tracking surface with a different surface material or appearance, moving between different focal distances, moving between different offsets of the input device 102 from the tracking surface, or the like), in response to a user command through the button 224 or a gesture detected by the IMU 222, or the like. This can reduce errors in the detection of the optical flow sensor 220 and improve spatial tracking of the input device 102.

The IMU 222 can be used to detect both relative and absolute motion and position of the input device 102. The IMU 222 can include a nine degree-of-freedom (DOF) IMU, which can include a 3-axis gyroscope, a 3-axis accelerometer, and a 3-axis magnetometer. However, in some examples, other IMUs, such as a six DOF IMU can be used. The accelerometer can be used to detect relative motion of the input device 102 in three dimensions, such as in an x-direction, a y-direction, and a z-direction of a Cartesian coordinate system. The gyroscope can be used to detect relative motion of the input device 102 in additional dimensions, such as pitch, yaw, and roll. The magnetometer can be used to detect an absolute position and motion of the input device 102, such as pitch and a pitch angle, yaw and a yaw angle, and roll and a roll angle. The relative and absolute motion and position data generated by the IMU 222 can be converted to an electrical signal (referred to as an IMU signal) and combined with data from the other sensors of the input device 102 in order to more accurately detect and track the position and movement of the input device 102, providing improved spatial tracking of the input device 102.

The IMU 222 can further be used to detect gestures performed with the input device 102. For example, the IMU 222 can detect motion of the input device 102 in a checkmark pattern, positioning of the input device 102 in a writing position, tapping the input device 102, rotating the input device 102, and any other gestures performed with the input device 102. The gesture data generated by the IMU 222 can be converted to an electrical signal (referred to as a gesture signal) and combined with data from the other sensors of the input device 102 and/or the computing system 104 in order to accurately detect and track gestures performed with the input device 102, providing improved spatial tracking of the input device 102.

In some examples, the IMU 222 can be used to correct for angular rotation of the input device 102. For example, the two-dimensional movement data generated by the optical flow sensor 220 (e.g., the relative motion signal) can vary depending on rotation of the input device 102 about a longitudinal axis of the input device 102. The IMU 222 can detect the angular rotation of the input device 102 in order to correct for rotation of the input device 102 and to maintain a user's "north." The user's north can be determined based on the magnetometer of the IMU 222 upon startup of the input device 102 or in response to a user command (e.g., in response to the user pressing the button 224, performing a gesture with the input device 102, holding the input device 102 in a specified position, holding the input device 102 in a specific position relative to a housing of the computing system 104, or the like). The startup of the input device 102 can be registered when a user removes the input device 102 from a charging or storage position (e.g., a storage position upon or along a housing of the computing system 104) or when the user turns on the input device 102. For example, the "north" or other default orientation (e.g., the direction presumed to be aligned with the direction the user's head and body are facing) of the input device 102 can be established by detecting the orientation of the input device 102 at the time the input device 102 is removed from the housing of the computing system 104 (or another dock or cradle). Based on changes in the IMU 222 signals thereafter, the position of the input device 102 relative to that "north" direction can be tracked. The "north" or default orientation of the input device 102 can be based on the shape of the housing of the computing system 104, the shape of the input device 102 and the orientation of the input device 102 relative to the computing system 104 when the input device 102 is being stored on the housing, and similar factors. After the user's "north" direction is set, the IMU 222 can detect angular rotation of the input device 102 and the relative motion signal of the optical flow sensor 220 can be altered to maintain the user's north (e.g., by the processor 202, or a processor of the computing system 104). In some examples, the optical flow sensor 220 can be used to detect rotation of the input device 102 without the IMU 222.

In this manner, the movement of the input device 102 can be interpreted in a manner directly related to and corresponding to the orientation of the computing system 104 at the time the input device 102 is removed from the computing system 104. In other words, a movement of the input device 102 away from the user (e.g., in the "north" direction relative to the user or a "north" direction relative to a reference point on the computing system 104) can cause an upward or positive y-axis movement of a cursor or other interface element on the computing system 104. Similarly, a left or right movement of the input device 102 (e.g., in an "west" or "east" direction relative to the user or relative to a reference point on the computing system 104) can cause a left or right movement of the interface element on the computing system 104. Without establishing a "north" or other initial relative position of the input device 102 to the computing system 104, the movement of the input device

102 may not correspond to the movement of the interface elements of the computing system 104, which may lead to a frustrating user experience, especially when the input device 102 is being used externally spaced away from the computing system 104. In that case, the computing system 104 may be unable to detect the position of the input device 102 relative to reference points on the computing system 104 itself. Furthermore, in some embodiments, the orientation of the input device 102 relative to the computing system 104 can be tracked and can change over time in response to movements of the computing system 104. For example, the computing system 104 can include an IMU or similar orientation sensor (e.g., sensors 328, discussed below with respect to FIG. 3), and movements of the computing system 104 can be detected and tracked to ensure that the reference direction (e.g., "north") of the input device 102 remains parallel to a reference line or dimension of the computing system 104, even if the computing system 104 moves from the position where it started when the input device 102 was removed or otherwise first detected its initial relative position with respect to the computing system 104. For example, with a tablet computing system, the user may rotate the computing system 104 on a tabletop while simulating writing on the tabletop using the input device 102, and the system 100 can require the input device 102 to write in a direction parallel to a dimension across the display of the computing system 104 (before and after the rotation of the computing system 104) to keep the writing appearing along the same direction on the display of the computing system 104.

The button 224 can be used to directly input user commands into the input device 102. For example, the button 224 can be used to provide "start" and "end" commands for inking or detecting motion of the input device through the optical flow sensor 220. The button 224 can be used to provide user commands for setting or calibrating the user's "north" direction or to provide a "click" input, similar to a computer pointing device such as a mouse button or mouse wheel. The button 224 can be used to provide any other user commands through the input device 102 as appropriate for an application being operated by the computing system 104.

The audio sensor 226 can be coupled to the input device adapter 214 and can be configured to provide inputs for the input device 102. The audio sensor 226 can include one or more microphones. The audio sensor 226 can provide inputs to the input device adapter 214 by including various ultrasonic components, such as an ultrasonic transceiver and/or an ultrasonic microphone. The audio sensor 226 can include a microphone that can receive ultrasonic soundwaves emitted from a speaker (e.g., a speaker 335, discussed below with respect to FIG. 3) of the computing system 104 to detect the position of the computing system 104 relative to the input device 102.

More specifically, one of the input device 102 or the computing system 104 (referred to as an emitting device of the system 100) can include a speaker that emits ultrasonic soundwaves, and the other of the input device 102 or the computing system 104 (referred to as a receiving device of the system 100) can include multiple microphones that detect the ultrasonic soundwaves to detect a position of the emitting device relative to the receiving device. In some examples, the receiving device can include three or more microphones in order to detect a three-dimensional position of the emitting device relative to the receiving device. The receiving device can include a processor, coupled to the microphones, that determines the position of the emitting device relative to the receiving device based on a respective timing of the microphones receiving an ultrasonic sound-wave emitted by the emitting device, a volume and frequency of the ultrasonic soundwave, and other qualities of the ultrasonic soundwave received by the microphones (e.g., via trilateration, multilateration, or any other similar geometric/trigonometric method or operation for finding a position or location of a point of interest in 3-D space or on Cartesian coordinate axes by means of bearings, distance, or time information from two or more fixed points in space whose locations are known relative to each other, such as by being at a known distance apart). This position data can be converted to an electrical signal (referred to as an ultrasonic position signal) and combined with data from the other sensors of the input device 102 in order to more accurately detect and track the position of the input device 102, providing improved spatial tracking of the input device 102 relative to the computing system 104.

The ultrasonic soundwaves can be emitted at a frequency in a range from about 20 kilohertz (kHz) to about 100 kHz, from about 20 kHz to about 80 kHz, or from about 25 kHz to about 50 kHz. Emitting the ultrasonic soundwaves with a greater frequency can increase a resolution for movement and position detected by the receiving device, but can decrease a range for detection by the receiving device. For example, the receiving device can detect a position of the emitting device with about 1 mm of resolution up to about 2 m at a frequency of about 40 kHz, and can detect the position of the emitting device with about 0.5 mm of resolution up to about 1 m at a frequency of about 80 KHz.

The audio transceiver 227 can be coupled to the input device adapter 214 and can be configured to provide inputs for the input device 102. The audio transceiver 227 can include one or more ultrasonic transducers. The audio transceiver 227 can provide inputs to the input device adapter 214 by including various ultrasonic components, such as an ultrasonic transceiver or transducer. The audio transceiver 227 can emit ultrasonic soundwaves and receive echoing ultrasonic soundwaves to detect the position of objects (e.g., the computing system 104), surfaces (e.g., the tracking surface of the optical flow sensor 220), and the like around the input device 102. Thus, the audio transceiver 227 can detect surfaces around the input device 102, and distances between the input device 102 and the surfaces can be determined based on this detection. For example, the audio transceiver 227 can be included at a tip of the input device 102 and facing in the same direction as the optical flow sensor 220. The audio transceiver 227 can detect a tracking surface of the optical flow sensor 220, and this detection can be used to determine a distance between the optical flow sensor 220 and the tracking surface. This distance data generated by the audio transceiver 227 can be converted to an electrical signal (referred to as a distance signal) and combined with data from the other sensors of the input device 102 (e.g., the relative movement signal from the optical flow sensor 220) in order to more accurately track the position and movement of the input device 102, providing improved spatial tracking of the input device 102 relative to the tracking surface.

The sensors 228 can include various sensors, such as a mechanical switch, a force sensor (e.g., a strain gauge, a capacitive gap force sensor, a piezoelectric sensor, or the like), a beacon transceiver (e.g., a radio or other electromagnetic signal transmitter and/or receiver), a capacitive electrode or other capacitive sensor, a radiofrequency sensor (and/or transmitter), an infrared sensor (and/or transmitter), a magnetic sensor (and/or generator), an electric field sensor (and/or emitter), combinations thereof, or the like. In examples in which the sensors 228 include a force sensor or mechanical switch, the sensors 228 can detect contact of the input device 102 with a surface. As used herein, "contact" refers to the input device 102 physically contacting a surface. The input device 102 can have a state of contact that can include a "contact state" or first state in which the input device 102 physically contacts and engages a surface and a "non-contact state," "out-of-contact state," or second state in which the input device 102 is separated or spaced away from the surface by a gap (e.g., an air gap). Similarly, the input device 102 can have a "contact condition" that can include a first contact condition in which the input device 102 physically contacts and engages a surface and a second contact condition in which the input device 102 is separated or spaced away from the surface by a gap (e.g., an air gap). The state of contact or the contact condition of the input device 102 can be used to provide "start" and "end" commands for inking through the input device 102. In other words, the mechanical switch or force sensor signal can indicate to the computing system 104 whether the user is intentionally providing an input based on movement of the input device 102 or whether the user is moving the input device 102 without intending to provide an input to the computing system 104. This can be analogous to a scenario when a user "clicks" or "click-drags" a mouse or trackpad versus when the user moves their mouse or finger without clicking. The force sensor or mechanical switch can be used to generate "start" and "end" commands when interacting with both active surfaces (e.g., touch-sensitive surfaces) and inactive surfaces (e.g., non-touch-sensitive surfaces). This contact data generated by the force sensor or mechanical switch of the sensors 228 can be converted to an electrical signal (referred to as a contact signal) and combined with data from the other sensors of the input device 102 in order to more accurately track the position and movement of the input device 102, providing improved spatial tracking of the input device 102 relative to the computing system 104.

In examples in which the input device 102 is used in electrical communication with a computing system 104 that includes a touch-sensitive or capacitance-sensitive interface (e.g., a touch screen or other touch input device 313), the sensors 228 and the touch screen can detect a position of the input device 102 relative to the touch-sensitive interface when the input device 102 is in contact with or positioned near the touch-sensitive interface. For example, the computing system 104 can include an electric field emitter, and the sensors 228 can include an electric field sensor. The electric field sensor can detect an electric field emitted by the electric field emitter of the computing system 104 to detect a position of the input device 102 relative to the touch-sensitive interface when the input device 102 is disposed at or near the touch-sensitive interface. The electric field sensor can be used to determine a distance from the input device 102 to a surface of the touch-sensitive interface of the computing system 104. In some examples, the electric field sensor of the sensors 228 can detect the electric field emitted from the touch-sensitive interface of the computing system 104 when the input device 102 is disposed within a range of about 0.1 millimeters (mm) to about 20 mm from the surface of the touch-sensitive interface of the computing system 104, or in a range of up to about 3 mm, up to about 5 mm, up to about 10 mm, up to about 13 mm, up to about 15 mm, or the like. This electric field data generated by the electric field sensor of the sensors 228 can be converted to an electrical signal (referred to as an electric field signal) and combined with data from the other sensors of the input device 102 in order to more accurately track the position and movement of the input device 102, providing improved spatial tracking of the input device 102 relative to the computing system 104.

The output device adapter 216 can be configured to provide the input device 102 with the ability to output information to a user, such as by providing audible output using a speaker of emitter 238, providing haptic feedback sensed by touch via a haptic feedback device 234, providing visual output using a light output device 236, and the like. The output device adapter 216 can also be configured to provide the input device 102 with the ability to output physical phenomena that can be detected by input devices of other electronic devices (e.g., input devices connected to an input device adapter 316 of the computing system 104, as discussed below with respect to FIG. 3). For example, the output device adapter 216 can be connected to the emitter 238, which can emit physical phenomena that can be detected by the input devices of the computing system 104. Other output devices can also be used. The processor 202 can be configured to control the output device adapter 216 to provide information to a user and to external devices, such as the computing system 104, via the output devices connected to the output device adapter 216.

The haptic feedback device 234 can be configured to provide haptic feedback to a user, such as by providing vibrations, pulses, nudges, tactile patterns, or the like. The haptic feedback device 234 can include an actuator that moves or fires in response to a command from the output device adapter 216. In some examples, the haptic feedback device 234 can provide feedback to the user of the input device 102 based on rotation of the input device 102 about a longitudinal axis of the input device 102 (e.g., roll movement or rotation about a roll axis of the input device 102). For example, the haptic feedback device 234 can provide haptic feedback (e.g., vibration) each time the input device 102 rolls about a roll axis by a threshold amount, such as about 1 degree) (°), about 5°, about 10°, or the like. In some examples, the haptic feedback device 234 can provide feedback based on movement of the input device 102 in other directions or about other axes, such as rotation around a front-to-back axis (e.g., pitch movement or rotation about a pitch axis of the input device 102), rotation around a side-to-side axis (e.g., yaw movement or rotation about a yaw axis of the input device 102), combinations of pitch, roll, and/or yaw, or the like. In some examples, the haptic feedback device 234 can provide feedback based on operating parameters of the input device 102, such as by indicating to the user when movement of the input device 102 is too fast for the optical flow sensor 220 to accurately detect a tracking surface, when the optical flow sensor 220 is disposed too far from the tracking surface to accurately detect the tracking surface, or the like. The haptic feedback device 234 can provide feedback based on the optical flow sensor 220 sensing a new tracking surface. The input device 102 may detect a first surface having a first surface condition (e.g., appearance, texture, color, distance) and then, at a later time, may detect a second surface having a second surface condition different from the first surface condition. The haptic feedback device 234 can indicate to the user that the change in the tracking surface has been detected, whether the second surface is usable for detection as a tracking surface, or other indicators. Thresholds for feedback provided to the user through the haptic feedback device 234 can be populated by default, and can be customized by a user of the input device 102. For example, the user can select which types of feedback to receive through the haptic feedback device 234 or at what intervals or conditions the feedback is provided by the haptic feedback device 234.

The input device 102 can include the emitter 238 connected to the output device adapter 216. In some examples, the emitter 238 can include one or more speakers that can emit ultrasonic soundwaves that can be received by microphones of the computing system 104. The microphones of the computing system 104 can detect the ultrasonic soundwaves in order to detect the position of the input device 102 relative to the computing system 104. In some examples, emitter 238 can include one or more speakers that can provide feedback to a user of the input device 102. For example, the emitter 238 can be coupled to the output device adapter 216, and can include a speaker configured to provide audible feedback to a user, such as by providing audible messages, other audible patterns, or the like.

In some examples, the emitter 238 can include an electric field emitter. For example, the input device 102 can be used in electrical communication with a computing system 104 that includes a touch-sensitive interface. The electric field emitter of the input device 102 can be used with the touch-sensitive interface of the computing system 104 to detect a position of the input device 102 relative to the touch-sensitive interface when the input device 102 is in contact with or positioned near the touch-sensitive interface. The touch-sensitive interface of the computing system 104 can detect an electric field emitted by the electric field emitter of the input device 102 to detect a position of the input device 102 relative to the touch-sensitive interface when the input device 102 is disposed at or near the touch-sensitive interface. In some examples, the computing system 104 can detect the electric field emitted from the electric field emitter of the input device 102 when the input device 102 is disposed within a range of about 0.1 mm to about 20 mm from a surface of the touch-sensitive interface of the computing system 104, or in a range of up to about 3 mm, up to about 5 mm, up to about 10 mm, up to about 13 mm, up to about 15 mm, or the like. This electric field data generated by the computing system 104 can be converted to an electrical signal (referred to as an electric field signal) and combined with data from the other sensors of the input device 102 in order to more accurately track the position and movement of the input device 102, providing improved spatial tracking of the input device 102 relative to the computing system 104.

FIG. 3 shows a block diagram of the computing system 104 that can be used to implement embodiments of the present disclosure. The computing system 104 can correspond to any form of electronic device, such as a portable media player, a media storage device, a portable digital assistant ("PDA"), a tablet computer, a computer, a mobile communication device such as a cellular phone, a global positions system (GPS) unit, a remote control device, a wearable device (e.g., a smart watch), or another electronic device. In various embodiments, the computing system 104 can include various sets and subsets of the components shown in FIG. 3. Thus, FIG. 3 shows a variety of components that can be included in various combinations and subsets based on the operations and functions performed by the computing system 104 in different embodiments. For example, the computing system 104 can be part of the system 100; can be part of systems 600, 700, 800, 900, 1000, described below with respect to FIGS. 3, 6, 7, 8, 9, and 10, respectively; and can be used for method 1100, described below with respect to FIG. 11.

The computing system 104 can include a central processing unit (CPU) or processor 302 connected via a bus 304 for electrical communication with a memory 306, a power source 308, an electronic storage device 310, a network interface 312, an input device adapter 316, and an output device adapter 320. One or more of these components can be connected to each other via a substrate (e.g., a printed circuit board or other substrate) supporting the bus 304 and other electrical connectors providing electrical communication between the components. The bus 304 can include a communication mechanism for communicating information between the components of the computing system 104.

The processor 302 can be a microprocessor or similar device configured to receive and execute a set of instructions 324 stored by the memory 306. The memory 306 can be referred to as a main memory, such as a random access memory (RAM) or another dynamic electronic storage device for storing information and instructions to be executed by the processor 302. The memory 306 can also be used for storing temporary variables or other intermediate information during execution of instructions by the processor 302. The processor 302 can include one or more processors or controllers, such as, for example, a CPU for the computing system 104 and a touch controller or similar sensor or I/O interface used for controlling and receiving signals from an input device (e.g., the input device 102 of FIG. 1), a touch input device 313, a keyboard 314, sensors 328, an audio transceiver 329, or the like. The power source 308 can include a power supply capable of providing power to the processor 302 and other components connected to the bus 304, such as a connection to an electrical utility grid (e.g., a wired power supply) or a battery system.

The storage device 310 can include a read-only memory (ROM) or another type of static storage device coupled to the bus 304 for storing static or long-term (e.g., non-dynamic) information and instructions for the processor 302. For example, the storage device 310 can include a magnetic or optical disk (e.g., hard disk drive (HDD)), a solid state memory (e.g., a solid state disk (SSD)), or a comparable device.

The instructions 324 can include information for executing processes and methods using components of the computing system 104. Such processes and methods can include, for example, the methods described in connection with other embodiments elsewhere herein. The instructions 324 can include performing method 1100, discussed below with respect to FIG. 11, performing commands or actions with systems 600, 700, 800, 900, 1000, discussed below with respect to FIGS. 6 through 10, and the like. The instructions 324 can include any methods for tracking a position and other characteristics of an input device and performing actions or commands on the computing system 104 in response to inputs from the input device.

The network interface 312 can include an adapter for connecting the computing system 104 to an external device via a wired or wireless connection. For example, the network interface 312 can provide a connection to a computer network 326 such as a cellular network, the Internet, a local area network (LAN), a separate device capable of wireless communication with the network interface 312, other external devices or network locations, and combinations thereof. In one example embodiment, the network interface 312 is a wireless networking adapter configured to connect via WI-FI®, BLUETOOTH®, BLE, Bluetooth mesh, or a related wireless communications protocol to another device having interface capability using the same protocol. In some embodiments, a network device or set of network devices in the network 326 can be considered part of the computing system 104. In some cases, a network device can be considered connected to, but not a part of, the computing system 104. The computing system 104 can communicate with the input device 102, as illustrated in FIG. 1, through the network interface 312 of the computing system 104 and the network interface 212 of the input device 102.

The input device adapter 316 can be configured to provide the computing system 104 with connectivity to various input devices such as, for example, the input device 102, a touch input device 313 (e.g., a display 332 of the computing system 104, which can be a touch-sensitive display), a keyboard 314 or other peripheral input device, one or more sensors 328, an audio transceiver 329, related devices, and combinations thereof.

In some examples, the input device adapter 316 is connected to the touch input device 313 and traces thereof to detect a position of touches or gestures on the display 332, e.g., through sensing changes in capacitance or applied forces. In some examples, the input device adapter 316 can include the touch controller or similar interface controller described above. In some examples, the input device adapter 316 can be connected to the input device 102 or other input tool, whether by a wired connection or by a wireless connection (e.g., via the network interface 312), to receive input via the touch input device 313 and via the input device 102. The input device adapter 316 can receive input from the touch input device 313 based on direct contact of the input device 102 to a surface of the computing system 104, such as an input surface of the display 332 or an input surface of another input device, such as a trackpad or touch pad. The input received by the input device adapter 316 from the touch input device 313 based on direct contact of the input device 102 on the display 332 of the computing system 104 can have high fidelity. As such, the input from the touch input device 313 based on direct contact of the input device 102 on the display 332 can be used as the input from the input device 102 when the input device 102 is in contact with the display 332. The keyboard 314 or another input device (e.g., buttons or switches) can be used to provide user input such as input regarding the settings of the computing system 104.

The sensors 328 can be used to detect physical phenomena in the vicinity of the computing system 104 (e.g., light, sound waves, electric fields, magnetic fields, forces, vibrations, ultrasonic transmissions, and the like) and to convert those phenomena to electrical signals. For example, the emitter 238 of the input device 102 can include an electric field emitter. The sensors 328 can detect an electric field emitted from the electric field emitter of the input device 102 when the input device 102 is disposed at or near the display 332 of the computing system 104. In some examples, the sensors 328 can detect the electric field emitted from the electric field emitter of the input device 102 when the input device 102 is disposed within a range of about 0.1 mm to about 20 mm from the display 332, or in a range of up to about 3 mm, up to about 5 mm, up to about 10 mm, up to about 13 mm, up to about 15 mm, or the like. The input received by the input device adapter 316 from the sensors 328 based on electric field emission by the input device 102 can have high fidelity. As such, the input from the sensors 328 based on electric field emission by the input device 102 can be used as the input from the input device 102 when the input device 102 is not in contact with the display 332, but is located in close proximity to the display 332 (e.g., the input device 102 is located within the above-described ranges of the display 332).

In some examples, the sensors 328 can include sensors that can provide detection and tracking of a position and movement of the input device 102 relative to the computing system 104. For example, the sensors 328 can include an optical sensor (e.g., a camera, an image sensor, or the like) that is configured to detect a reference point on the input device 102 (e.g., a tip of the input device 102 or other visual marker on the input device 102). The sensors 328 can include multiple optical sensors that can be configured to detect the reference point on the input device 102 in three dimensions (e.g., in an x-direction, a y-direction, and a z-direction of a Cartesian coordinate system) and along multiple axes relative to the sensors 328 (e.g., along a pitch axis, along a roll axis, and along a yaw axis). In some embodiments, the optical sensors of the sensors 328 can perform motion capture on the input device 102. In some embodiments, the sensors 328 can include at least one microphone, such as an ultrasonic receiver. When the sensors 328 include an ultrasonic receiver, the ultrasonic receiver can be configured to receive an ultrasonic sound-wave that is emitted by the emitter of the input device 102. The ultrasonic receiver of the sensors 328 can be used with an ultrasonic emitter of the input device 102 to detect a position and movement of the input device 102 relative to the computing system 104. The sensors 328, including the optical sensors and/or the ultrasonic sensors, can be used to detect a position and movement of the input device 102 relative to the computing system 104 in multiple dimensions, such as in an x-direction, a y-direction, a z-direction, along a pitch axis, along a roll axis, and along a yaw axis.

In some examples, an audio transceiver 329 can be coupled to the input device adapter 316 and can be configured to provide inputs for the computing system 104. The audio transceiver 329 can include one or more ultrasonic transducers. The audio transceiver 329 can provide inputs to the input device adapter 316 by including various ultrasonic components, such as an ultrasonic transceiver or transducer. The audio transceiver 329 can emit ultrasonic soundwaves and receive echoing or reflected ultrasonic soundwaves to detect the position of objects (e.g., the input device 102), surfaces (e.g., a tracking surface of the optical flow sensor 220 of the input device 102), and the like around the computing system 104. Thus, the audio transceiver 329 can detect the input device 102 and surfaces around the input device 102. Distances between the input device 102 and the surfaces can be determined based on this detection.

The sensors 328 can include an IMU, which can be the same as or similar to the IMU 222 included in the input device 102 and discussed above with respect to FIG. 2. The IMU of the sensors 328 can be used to measure and correct for angular rotation of the computing system 104. For example, the two-dimensional movement data generated by the optical flow sensor 220 of the input device 102 can be output to the computing system 104 based on coordinates of the computing system 104 in an x-direction and a y-direction. The coordinates of the computing system 104 can be based on a "device north" direction for the computing system 104. The IMU of the sensors 328 can detect the angular rotation of the computing system 104 in order to correct for rotation of the computing system 104 and to maintain the device north. The device north can be determined based on the magnetometer of the IMU of the sensors 328 upon startup of the computing system 104, in response to a user command (e.g., in response to the user pressing the button 224, performing a gesture with the input device 102, holding the input device 102 in a specified position (e.g., against the computing system 104), holding the input device 102 in a specific position relative to a housing of the computing system 104, providing input via another interface (e.g., the keyboard 314), or the like). The startup of the computing system 104 can be registered when a user removes the computing system 104 from a charging or storage position, such as along or against a housing of the computing system 104, or when the user turns on the computing system 104 or the input device 102. After the device north is set, the IMU of the sensors 328 can track angular rotation of the computing system 104 and the relative motion signal of the optical flow sensor 220 can be altered to maintain the device north (e.g., by the processor 302). Thus, the "device north" can be tracked and modified over time in the manner described above in connection with the user's "north."

The output device adapter 320 can be configured to provide the computing system 104 with the ability to output information to a user, such as by providing visual output using a display 332, by providing audible output using a speaker 335, or providing haptic feedback sensed by touch via a haptic feedback device 337. In some examples, the speaker 335 can include an ultrasonic emitter, which can emit ultrasonic soundwaves that can be received by the audio sensor 226 of the input device 102. The audio sensor 226 of the input device 102 can detect the ultrasonic soundwaves in order to detect the position of the computing system 104 relative to the input device 102. Other output devices can also be used. The processor 302 can be configured to control the output device adapter 320 to provide information to a user via the output devices connected to the output device adapter 320. In some embodiments, the processor 302 and/or output device adapter 320 can be used to filter, curve-fit, interpolate, or smooth input provided to the input device adapter 316 from the various sensors that detect movement and position of the input device 102.

The processor 302 of the computing system 104 and the processor 202 of the input device 102 can select and combine the various signals from the input devices (e.g., the input devices in communication with the input device adapter 316 and the input devices in communication with the input device adapter 214) in order to accurately track the position and movement of the input device 102 relative to a surface (e.g., a tracking surface) or relative to the computing system 104 depending on the context that the input device 102 is used with the computing system 104. For example, signals from the touch input device 313, the sensors 328, and the audio transceiver 329 can be used when the input device 102 is touching or near the display 332 of the computing system 104. Signals from the optical flow sensor 220 can primarily be used when the input device 102 is a moderate distance from the display 332, touching another passive or active surface, or spaced a moderate distance away from a work surface (e.g., a tracking surface of the optical flow sensor 220 of the input device 102 such as desktop, a paper pad, mousepad, or another surface that is not part of the computing system 104). The signals from the optical flow sensor 220 can be combined with signals from the IMU 222, the audio sensor 226, the audio transceiver 227, the sensors 228, the sensors 328, and the audio transceiver 329 to correct the signal from the optical flow sensor 220 based on a distance between the optical flow sensor 220 and a tracking surface and based on a relative angle of the optical flow sensor 220 and the tracking surface. The signals from the button 224, the sensors 228, the touch input device 313, the sensors 328, and the audio transceiver 329 can be used to provide "start" and "end" commands for the input device 102. The signals from the IMU 222, the audio sensor 226, the audio transceiver 227, the sensors 228, the sensors 328, and the audio transceiver 329 can primarily be used when the input device 102 is a great distance from the display 332 or another surface. Further, different signals can be used from the input devices depending on what activities are performed by the input device 102 relative to the computing system 104. Additionally, the computing system 104 can rely on a first set of input device signals when the input device 102 is being used with a first computer setting (e.g., a first application is being operated on the computing system 104, such as a drawing application) and can rely on a second set of input device signals, different from the first set, when the input device 102 is being used with a second computer setting (e.g., a second application is being operated on the computing system 104, such as a music application).

Figure 4A:
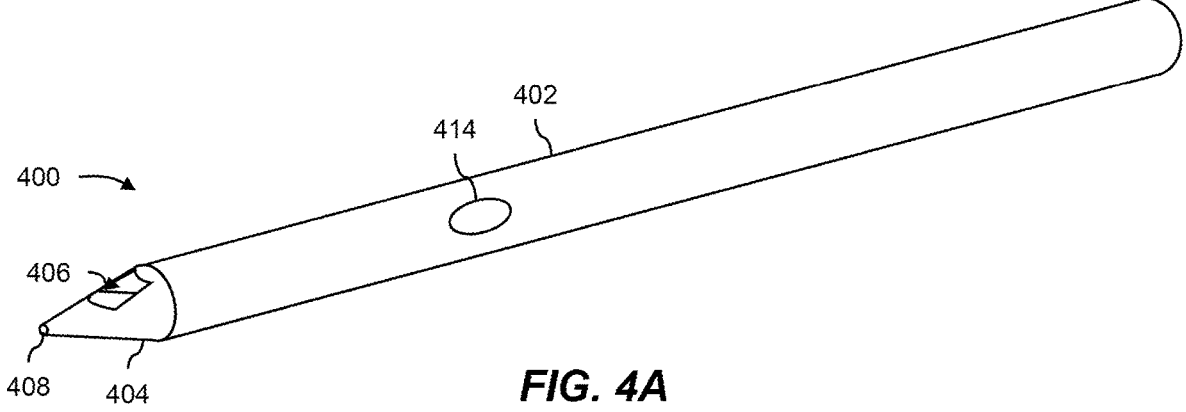
FIG. 4A shows a perspective view of an input device.
Figure 4B:
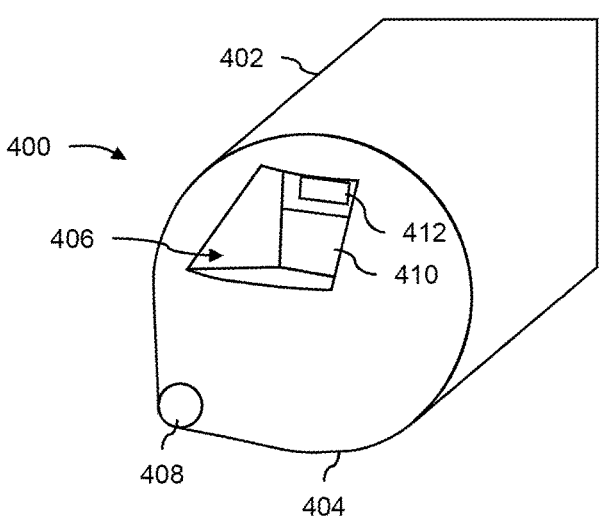
FIG. 4B shows a perspective view of a portion of the input device of FIG. 4A.

FIGS. 4A and 4B show perspective views of an input device 400 that can be used to implement embodiments of the present disclosure. The input device 400 can be the same as or similar to the input device 102, discussed above with respect to FIGS. 1 through 3, and can include any or all of the components of the input device 102. In some examples, the input device 400 can be a stylus. The input device 400 can include a body portion 402 and a tip portion 404 coupled to the body portion 402. In the example of FIGS. 4A and 4B, the body portion 402 is a longitudinally elongated body portion or shaft that is cylindrical or substantially cylindrical, with a substantially circular or elliptical cross-section. In some examples, the body portion 402 can have a rectangular, triangular, oblong, hexagonal, octagonal, or other polygonal cross-section elongated into a three-dimensional shape. In some cases, the body portion 402 may have one or more faceted or flattened surfaces among other curved surfaces, such as in cases where the body portion 402 is intended to lie flat against a surface of the computing system 104 or another flat support surface. See, e.g., the cross section of input device 102 shown in FIG. 6. In some examples, the input device 400 can be a different type of input device, such as a mouse, a joystick, a trackball, a wand, a baton, or the like, and can be shaped accordingly. In the example of FIGS. 4A and 4B, the tip portion 404 is conical, frusto-conical, or substantially conical. The tip portion 404 can have any desired shape, such as rounded, spherical or partially spherical, triangular, or any other desired shape.

The tip portion 404 can include an opening 406 and a tip 408. The tip 408 can include various sensors, such as any of the sensors 228, discussed above with respect to FIG. 2. In some examples, a switch, a force sensor, and/or an electric field emitter can be positioned at the tip 408 of the input device 400. The force sensor can be positioned at the tip 408 such that the force sensor detects a force and/or direction of contact of the tip 408 when the tip 408 contacts a surface or otherwise has a force applied to it. Similarly, the electric field emitter can be positioned at or near the tip 408 such that the electric field emitter can be positioned proximal to, and detectable by, a display of a computing system (e.g., the display 332 of the computing system 104) when the input device 400 is near to or contacts the display. This can maximize hover detection between the display of the computing system and the input device 400. The force sensor and/or the electric field emitter can be disposed radially centrally in the tip portion 404 at or near the tip 408.

The opening 406 can be positioned in the tip portion 404 between the tip 408 and the body portion 402. The opening 406 can be between the tip 408 and the body portion 402 both radially and in a direction parallel to a longitudinal axis of the body portion 402. The opening 406 can be offset from a radial center of the tip portion 404 (e.g., radially offset from the tip 408). Although the opening 406 is illustrated in FIGS. 4A and 4B as having a rectangular shape, the opening 406 can be circular, oval, rounded, triangular, or can have any other desired shape.

An optical flow sensor 410 and a light emitter 412 are disposed in the opening 406. The opening 406 can include a transparent cover over the optical flow sensor 410 and the light emitter 412, such as a glass, a plastic, or any other substantially transparent cover layer, material, component, or assembly. In some embodiments, the tip portion 404 can entirely comprise a transparent material, thereby allowing the sensor 410 to receive light (ambient or from the emitter 412) through the tip portion 404 rather than through opening 406. The optical flow sensor 410 can be the same as or similar to the optical flow sensor 220, discussed above with respect to FIG. 2. The light emitter 412 can be the same as or similar to the light emitter, discussed above with respect to the optical flow sensor 220 of FIG. 1.

Because the input device 400 is shaped as an elongate device that does not cover a surface that is detected by the optical flow sensor 410 and thereby block out ambient light around the bottom of the input device 400 and the surface, the light emitter 412 can be omitted in some examples. Specifically, the optical flow sensor 410 can be configured to detect motion of the input device 400 relative to a surface in ambient light conditions without requiring the light emitter 412 illuminating the surface.

In the example of FIGS. 4A and 4B, the optical flow sensor 410 and the light emitter 412 are disposed adjacent to one another in the opening 406. In some examples, the optical flow sensor 410 and the light emitter 412 can be disposed in separate openings in the tip portion 404 or otherwise disposed in the input device 400 such that the light emitter 412 illuminates a surface that the optical flow sensor 410 detects relative to a position of the input device 400.

The input device 400 can further include a button 414. The button 414 can be the same as or similar to the button 224, discussed above with respect to FIG. 2. The button 414 can be disposed in any desired position on the body portion 402 or the tip portion 404. The button 414 can have any desired shape, such as a circle, an oval, a rounded shape, a square, a rectangle, another geometric shape, or any other suitable shape.

Figure 5:
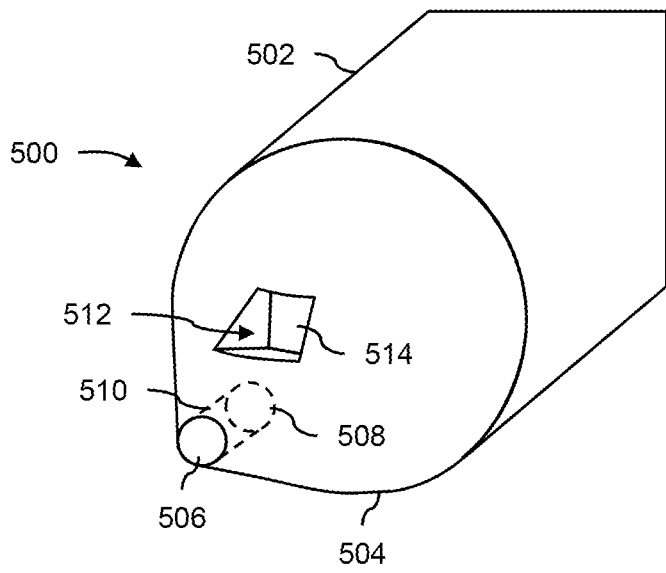
FIG. 5 shows a perspective view of a portion of an input device.

FIG. 5 shows a perspective view of an input device 500 that can be used to implement embodiments of the present disclosure. The input device 500 can be the same as or similar to the input device 400 discussed above with respect to FIG. 4, except that the input device 500 includes an optical flow sensor 508 disposed centrally near a tip 506 in a tip portion 504 of the input device 500. In the example of FIG. 5, the input device 500 includes an elongate body portion 502 and the tip portion 504 coupled to the elongate body portion 502. The tip portion 504 includes a transparent spacer 510 that separates the optical flow sensor 508 from the tip 506 of the tip portion 504.

The transparent spacer 510 can separate the optical flow sensor 508 from the tip 506 by a distance, such as a minimum focal distance of the optical flow sensor 508, based on the length dimension of the spacer 510. The distance can be configured to ensure that the optical flow sensor 508 is separated from a surface by the minimum focal distance, even when the tip 506 contacts a surface. The distance can be greater than or equal to about 1 mm, about 2 mm, about 4 mm, about 6 mm, about 8 mm, about 10 mm, or the like. The transparent spacer 510 can be formed of glass, plastic, or any other substantially transparent layer, material, component, or assembly.

The sensors of the input device 400 disposed at the tip 408 can be omitted in the example of FIG. 5, and signals from other sensors can be used to detect contact between the input device 500 and a surface, or otherwise detect when start and end commands are generated by the input device 500. For example, any of the sensors of the input device 102 and/or the computing system 104, discussed above with respect to FIGS. 1 through 3, may be used to determine start and end commands for the input device 102 and to determine when the input device 102 contacts a surface.

FIGS. 6 through 10 illustrate systems 600, 700, 800, 900, 1000 for performing various commands or actions. Specifically, input devices 102 can be used to perform actions or commands for computing systems 104 in systems 600, 700, 800, 900, and 1000.

Figure 6:
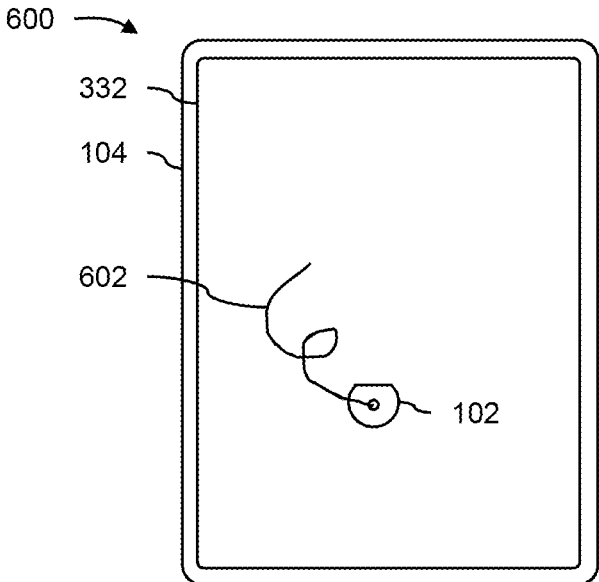
FIG. 6 shows a top-down view of a system including an input device and a computing system.

In FIG. 6, a system 600 includes an input device 102 and a computing system 104. The input device 102 and the computing system 104 can be the same as or similar to the input device 102 and the computing system 104, respectively, discussed above with respect to FIGS. 1 through 3, and can include any or all of the components of the input device 102 and the computing system 104. The computing system 104 can include a display 332, which can be a touch-, force-, or capacitance-sensitive interface or a non-touch-, force-, or capacitance-sensitive surface (e.g., a surface that is not configured to detect the presence of the input device 102 relative to the display 332).

In the example of FIG. 6, the input device 102 is moved in a line 602 (or curve or path), and the path of the input device 102, as detected by the computing system 104, is used to generate a visible line on the display 332. Alternatively, the system 104 can use signals detected from the input device 102 to perform other functions such as moving a cursor or other interface element. In examples in which the display 332 is a touch-sensitive interface, the touch-sensitive interface can detect movement of the input device 102 relative to the touch-sensitive interface as the input device 102 contacts a surface of the touch-sensitive interface (e.g., along the line 602). This can be used as an input signal to interact with a program or application of the computing system 104. In examples in which the input device 102 includes an electric field emitter and the display 332 includes an electric field detector or a capacitance detector, the display 332 can detect movement of the input device 102 relative to the detector as the emitter of the input device 102 contacts or is near the detector. Thus, the detection of the emitter can be used as an input signal to interact with the computing system 104. In examples in which the display 332 is not configured to detect the presence of the input device 102, an optical flow sensor 220 of the input device 102 can detect two-dimensional movement of the input device 102 relative to the display 332. This signal can be combined with signals from any sensors that detect a distance from the input device 102 to the display 332 and/or additional dimensions of the input device 102 (e.g., any of a pitch, a pitch angle, a yaw, a yaw angle, a roll, and a roll angle of the input device 102). This combined signal can be used as an input signal to interact with the computing system 104 (e.g., to generate the line 602 on the display 332). Thus, various sensor combinations can be used in the display 332 and sensors present in the input device 102 to interact with the computing system 104 using the input device 102.

Figure 7:
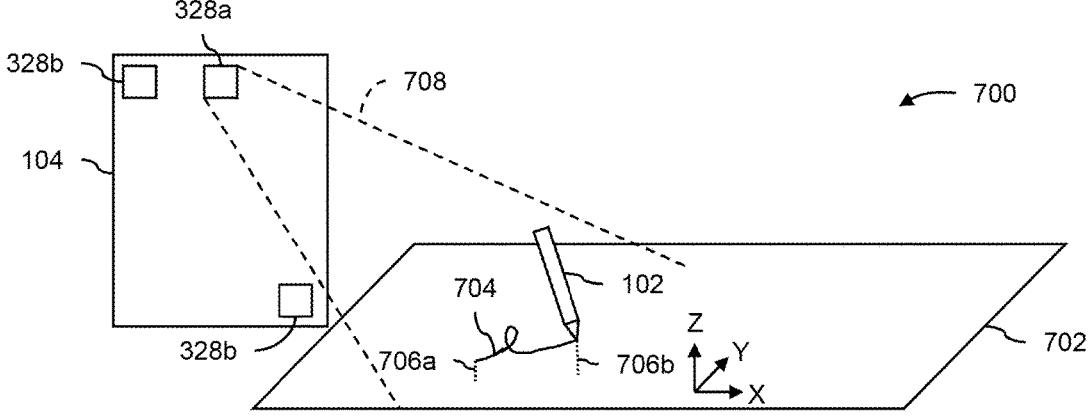
FIG. 7 shows a top-down view of a system including an input device, a computing system, and a passive surface.

In FIG. 7, a system 700 includes an input device 102 and a computing system 104. The input device 102 and the computing system 104 can be the same as or similar to the input device 102 and the computing system 104, respectively, discussed above with respect to FIGS. 1 through 3, and can include any or all of the components of the input device 102 and the computing system 104 described above. The computing system 104 can include sensors 328, which can include at least one optical sensor 328a and ultrasound sensors 328b (e.g., two or more ultrasound receivers).

In the example of FIG. 7, the input device 102 is moved in a line 704 (or curve or path). The input device 102 is spaced a distance 706a from a passive surface 702 at a starting point and a distance 706b from the passive surface 702 at and end point. The line 704 may extend in an x-direction and a y-direction, and the distances 706a, 706b may be in a z-direction, and may change over the course of the line 704. The passive surface 702 may be a surface separate from the computing system 104, such as a tabletop, a desk, a book, a mousepad, or another surface near, but not part of, the computing system 104. In some embodiments, the passive surface 702 can be a part of the computing system 104 that is not otherwise configured to receive touch, force, or capacitive input, such as a portion of a housing of the computing system 104 (e.g., a palm rest or other nearby housing surface of a notebook computer or a portion of a case (e.g., a cover flap) of a case or cover of the computing system 104). The passive surface 702 can comprise an opaque, substantially matte/non-reflective surface for detection by the input device 102. The input device 102 can include an optical flow sensor that can detect movement of the input device in two orthogonal directions, axes, or dimensions (e.g., in the x-direction and in the y-direction, as indicated in FIG. 7) relative to the passive surface 702.

The optical sensor 328a and/or the ultrasound sensors 328b can be included in the computing system 104 to detect a distance from the input device 102 to the passive surface 702 (e.g., in the z-direction, orthogonal to the x-and y-directions). The optical sensor 328a and/or the ultrasound sensors 328b can also detect additional orientation information about the input device 102 (e.g., any combination of a pitch displacement, an absolute pitch angle, a yaw displacement, an absolute yaw angle, a roll displacement, and an absolute roll angle of the input device 102). As used herein, an "absolute" angle refers to an angle as measured relative to a gravitational, downward direction, either by angular offset from the downward direction or by rotational offset about an axis parallel to the gravitational direction. Thus, the signal from the optical flow sensor of the input device 102 can be combined with signals from the optical sensor 328a and/or the ultrasound sensors 328b to determine positioning information not detected by the optical flow sensor. These combined signals can be used as an input signal to perform an action or command on the computing system 104 in response to the input device 102 moving along the line 704. This can be used to reduce error in determining the orientation and movement of the input device 102 relative to the passive surface 702, such as when the input device 102 is disposed at various distances from the passive surface 702 or at various angles with respect to the passive surface 702 and the optical flow sensor of the input device 102 may not accurately be able to detect its position. Furthermore, the additional orientation information can be used to provide additional functionality to a program or application being operated by the computing system 104, such as by providing pen tilt functionality or three-dimensional navigation or interface/object manipulation for artistic or computer-assisted design tools. Furthermore, with the input device 102 offset and positioned away from the computing system 104 (e.g., by the distances 706a, 706b) on the passive surface 702, this configuration can enable the user to have an unblocked view of the computing system 104 (e.g., without the input device 102 disposed between the user's eyes and a display or other visual interface of the computing system 104). Furthermore, as compared to a typical touch screen interface of a computing system, the dimensional area of the passive surface 702 can be significantly larger than the size of the screen without significantly increasing the weight or energy consumption of the computing system 104, thereby giving the user improved freedom of movement to interact with the computing system 104.

Although one optical sensor 328a and two ultrasound sensors 328b are illustrated in FIG. 7, any number of optical sensors 328a and ultrasound sensors 328b can be included, and a greater number of optical sensors 328a and ultrasound sensors 328b be can be used to track additional dimensions of the input device 102. The optical sensor 328a can have a field of view 708 and can detect the input device 102 as long as the input device 102 remains within the field of view 708. The ultrasound sensors 328b can have a detection range and can detect the input device 102 as long as the input device 102 is within the range of the ultrasound sensors 328b, such as within 2 meters (m), within 1.5 m, within 1.0 m, or the like.

Figure 8:
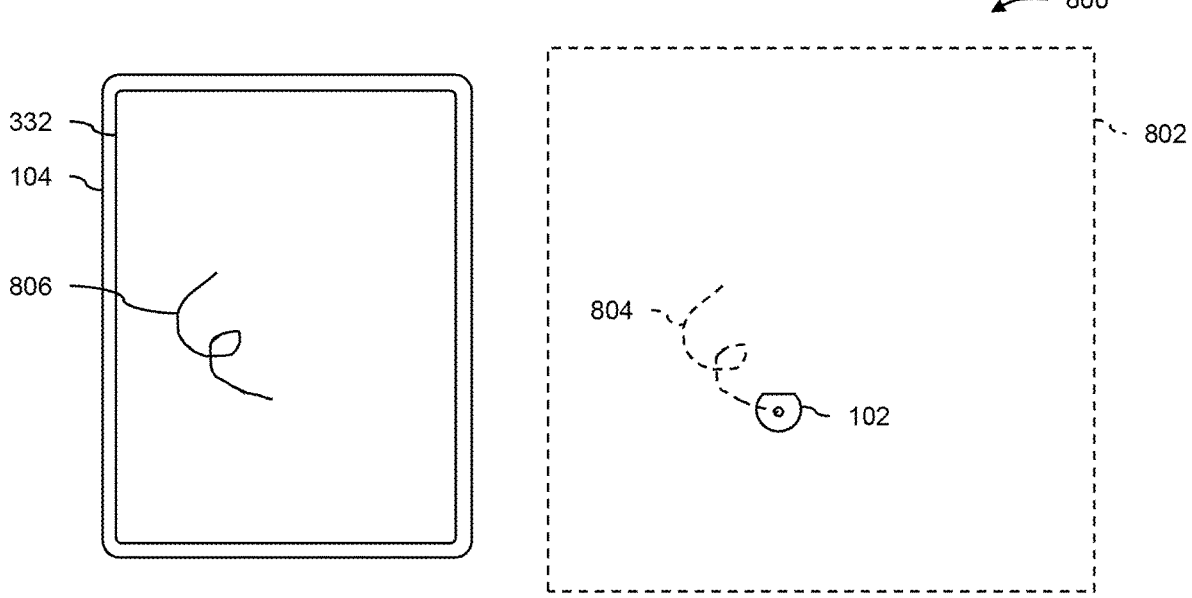
FIG. 8 shows a top-down view of a system including an input device, a computing system, and a passive surface.

In FIG. 8, a system 800 includes an input device 102 and a computing system 104. The input device 102 and the computing system 104 can be the same as or similar to the input device 102 and the computing system 104, respectively, discussed above with respect to FIGS. 1 through 3, and can include any or all of the components of the input device 102 and the computing system 104. The computing system 104 can include a display 332.

In the example of FIG. 8, the input device 102 is moved along a line 804 (or curve or path) on a passive surface 802 and is used to generate a line 806 on the display 332 via a program or application of the computing system 104. In the example of FIG. 8, the line 806 is generated based on only the set of input devices of the input device 102, without using input devices of the computing system 104. The input device 102 can contact the passive surface 802 or can be disposed above the passive surface 802. An optical flow sensor of the input device 102 can detect two-dimensional movement of the input device 102 relative to the passive surface 802. This signal can be combined with signals from any sensors that detect a distance from the input device 102 to the passive surface 802 and/or additional dimensions of the input device 102 (e.g., any combination of a pitch displacement, an absolute pitch angle, a yaw displacement, an absolute yaw angle, a roll displacement, and an absolute roll angle of the input device 102). The signal from the optical flow sensor can be combined with signals of an inertial measurement unit (IMU), a button, an audio sensor, an audio transceiver, sensors, and any other input devices of the input device 102. This combined signal can be used as an input signal to draw the line 806 on the display 332 based on the input device 102 moving along the line 804 on the passive surface 802. This can be used to correct apparent movement of the input device 102 relative to the passive surface 802, such as when the input device 102 is disposed at various distances from the passive surface 802 or at various angles with respect to the passive surface 802.

Figure 9:
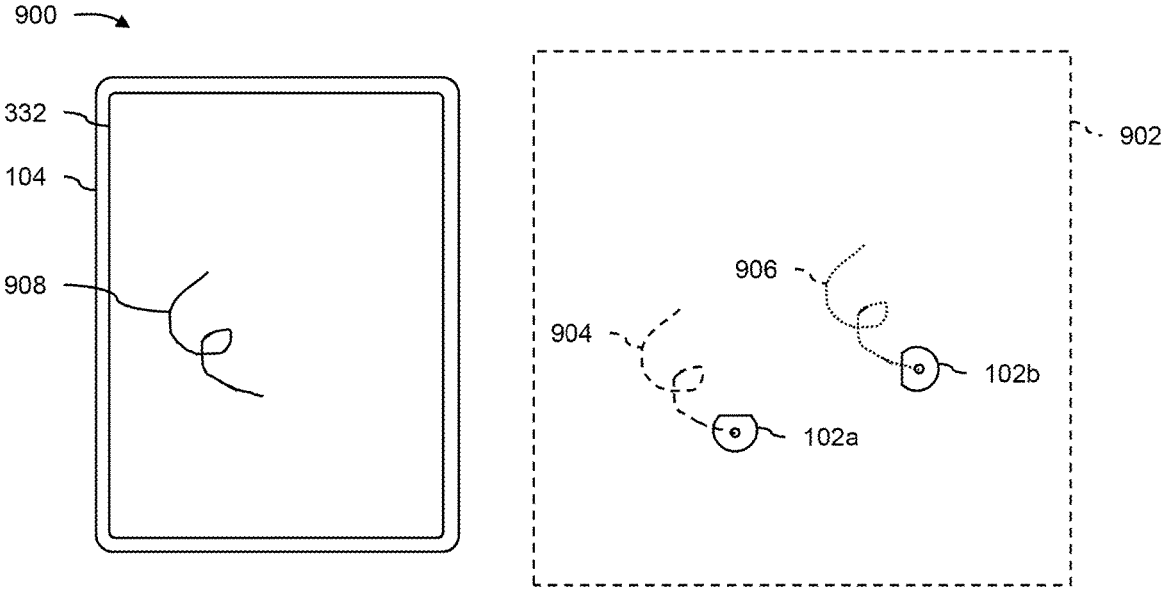
FIG. 9 shows a top-down view of a system including an input device, a computing system, and a passive surface.

In FIG. 9, a system 900 includes an input device 102 and a computing system 104. The input device 102 and the computing system 104 can be the same as or similar to the input device 102 and the computing system 104, respectively, discussed above with respect to FIGS. 1 through 3, and can include any or all of the components of the input device 102 and the computing system 104. The computing system 104 can include a display 332.

In the example of FIG. 9, two different positions and orientations of the input device 102 are shown. First, the input device 102 is shown as it would be moved along a line 904 (or a curve or path) on a passive surface 902 at a first roll angle, as indicated by the input device 102 at a first orientation and position 102a. Second, the input device 102 is shown as it would be moved along a line 906 (or a curve or path) on the passive surface 902 at a second roll angle, as indicated by the input device 102 at a second orientation and position 102b. In either case, the movement of the input device 102 can be used to generate a line 908 on the display 332 via a program or application of the computing system 104. As discussed with respect to FIG. 2, the input device 102 can include an IMU, which can be used to maintain a user's "north." The user's north can be established at a startup time of the input device 102, in response to a movement, position, or command supplied to the input device 102, or the like, as explained above. Once the user's north is set, a signal from the IMU can be combined with a signal from an optical flow sensor of the input device 102 to correct for any changes in the roll of the input device 102.

Specifically, in the example of FIG. 9, the optical flow sensor of the input device 102 can detect two-dimensional movement of the input device 102 relative to the passive surface 902, and the IMU of the input device 102 can detect the roll of the input device 102. Based on the IMU signal being combined with the optical flow sensor signal, the line 908 generated on the display 332 is the same for moving the input device 102 along the line 904 at the first roll angle and for moving the input device 102 along the line 906 at the second roll angle.

The input device 102 can contact the passive surface 902 or can be disposed above the passive surface 902 when moving the input device 102 along the lines 904, 906. The optical flow sensor of the input device 102 can detect two-dimensional movement of the input device 102 relative to the passive surface 902 (e.g., across a plane defined by the top surface of the passive surface 902), and the IMU of the input device 102 can detect roll of the input device 102. The signal from the optical flow detector and the signal from the IMU can further be combined with signals from any sensors that detect a distance from the input device 102 to the passive surface 802 and/or additional dimensions of the input device 102 (e.g., any combination of a pitch displacement, an absolute pitch angle, a yaw displacement, an absolute yaw angle, a roll displacement, and an absolute roll angle of the input device 102). This combined signal can be used as an input signal to draw the line 908 on the display 332 based on the input device 102 moving along the lines 904, 906 on the passive surface 902. The combined signal can be used to correct apparent movement of the input device 102 relative to the passive surface 902, such as when the input device 102 is disposed at various distances from the passive surface 902 or at various angles with respect to the passive surface 902.

As discussed with respect to FIG. 3, the computing system 104 can also include an IMU. The IMU of the computing system 104 can be used to maintain a "device north" of the computing system 104. The device north can be set at startup of the computing system 104, in response to a movement, position, or command of the input device 102 or the computing system 104, or the like. Once the device north is set, a signal from the IMU of the computing system 104 can be combined with a signal from the optical flow sensor of the input device 102 to correct for any changes in an angular orientation of the computing system 104.

Figure 10:
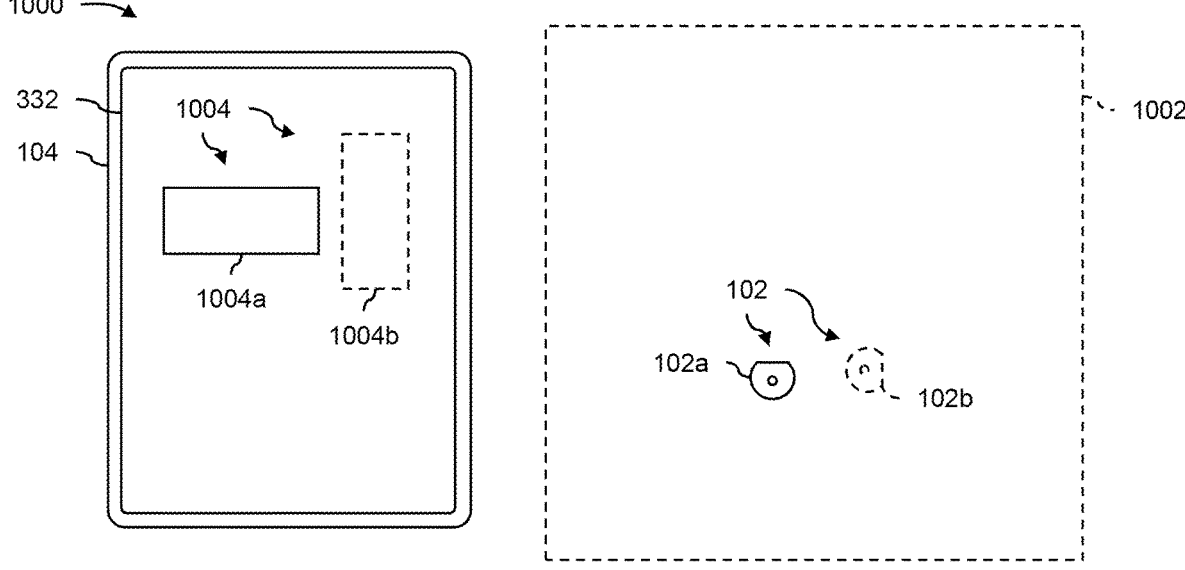
FIG. 10 shows a top-down view of a system including an input device, a computing system, and a passive surface.

In FIG. 10, a system 1000 includes an input device 102 and a computing system 104. The input device 102 and the computing system 104 can be the same as or similar to the input device 102 and the computing system 104, respectively, discussed above with respect to FIGS. 1 through 3, and can include any or all of the components of the input device 102 and the computing system 104. The computing system 104 can include a display 332.

In the example of FIG. 10, the input device 102 is rotated along a roll axis from a first position 102a to a second position 102b and is used to rotate a FIG. 1004 (e.g., a visual user interface element or other visual content) on the display 332 from a first position 1004a to a second position 1004b. The input device 102 can include an IMU, which can be used to detect and track a roll angle or roll displacement of the input device 102. By tracking the roll characteristics of the input device 102, additional actions or commands can be performed with the input device 102. For example, rotating the input device 102 about the roll axis of the input device 102 can be used to rotate the FIG. 1004 on the display 332 or to otherwise interact with visual content or settings of the computing system 104. Other dimensional and orientation aspects of the input device 102 can be tracked through the IMU and other sensors of the input device 102 and the computing system 104 and can similarly be used to perform additional actions and commands on the computing system 104. For example, the input device 102 and/or the computing system 104 can track three-dimensional position (e.g., x-, y-, and z-coordinates) and movement of the input device 102 (e.g., including gestures of the input device 102), and additional dimensional position and movement of the input device 102 (e.g., any combination of a pitch displacement, an absolute pitch angle, a yaw displacement, an absolute yaw angle, a roll displacement, and an absolute roll angle of the input device 102). Any of these characteristics of the input device 102 can be used to perform actions and/or commands on the computing system 104. This can include moving a cursor, drawing a line, drawing multi-dimensional shapes, painting, zooming in and out, navigating through windows, navigating through multi-dimensional spaces, other commands or actions, and combinations thereof.

Figure 11:
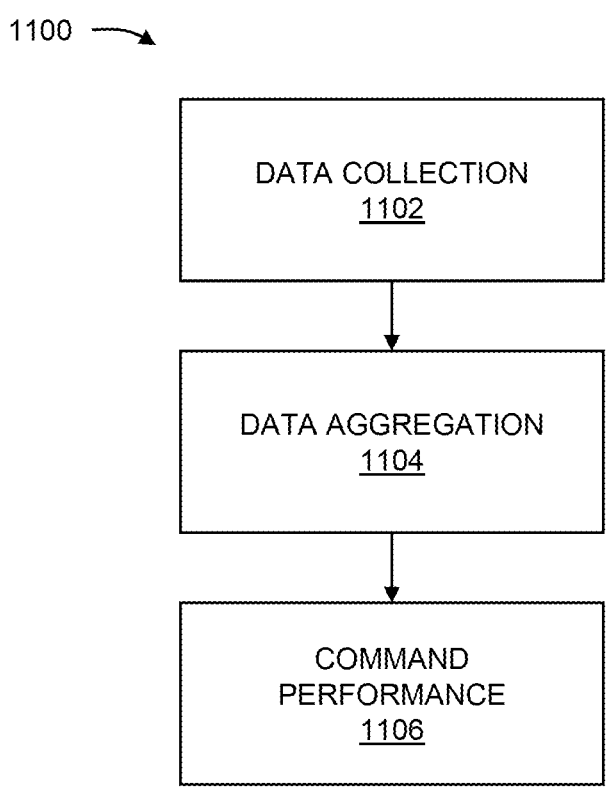
FIG. 11 shows a flow diagram of a method of performing an action on a computing system in response to signals from an input device.

FIG. 11 shows a flow diagram of a method 1100 that can be used to implement embodiments of the present disclosure. The method 1100 can be used to collect data from sensors of an input device and/or sensors of a computing system, and use the data to perform actions and improve the functionality and operation of the computing system. The method 1100 can be used with any of the input devices 102, 400, 500, computing systems 104, and systems 100, 600, 700, 800, 900, 1000, discussed above with respect to FIGS. 1 through 10. The method 1100 can be embodied in the set of instructions 218 and/or 324 stored in the memory 206 and/or 306. The method 1100 can include block 1102 related to data collection, block 1104 related to data aggregation, and block 1106 related to command performance, as explained below.

In connection with block 1102, the method 1100 can include collecting data from various sensors of an input device and/or a computing system, such as the various input devices and computing systems described elsewhere herein. The data can be collected from specific sensors that are used in a specific context or from all sensors present in the input device and/or the computing system. For example, the data collection at block 1102 can collect data from an optical flow sensor, an IMU, a button, an audio sensor, an audio transceiver, and other sensors of the input device. The data collection at block 1102 can also collect data from a touch input device, sensors, and an audio transceiver of the computing system. The data collection at block 1102 can further include analyzing the signals from the sensors of the input device and/or the computing system to detect and identify movement of the input device in at least two dimensions relative to a surface, three-dimensional positioning and movement of the input device relative to a surface, three-dimensional positioning and movement of the input device relative to the computing system, additional dimensional positioning and movement of the input device (e.g., any combination of a pitch displacement, an absolute pitch angle, a yaw displacement, an absolute yaw angle, a roll displacement, and an absolute roll angle of the input device), and the like. In some embodiments, the data collection at block 1102 can include emitting light from a light source to illuminate a surface being detected by an optical flow sensor. In some embodiments, block 1102 can include initializing a data collection operation by calibrating the position of the input device relative to the computing system or relative to a secondary surface (e.g., a passive surface), as described above, and then collecting displacement data indicating movement of the input device relative to that initial or calibrated position.

In block 1104, the method 1100 can include combining or aggregating data from various sensors of the input device and/or the computing system. The data aggregation at block 1104 can combine data from specific sensors of the input device and/or the computing system depending on a position of the input device relative to the computing system and/or a passive surface. For example, a touch-sensitive surface of the computing system can be used to detect and track the input device when the input device contacts, or is in close proximity to, the touch-sensitive surface (e.g., at a distance less than or equal to the width, diameter, or length of the input device); an optical flow sensor of the input device can be used to detect two-dimensional movement of the input device relative to the computing system or the passive surface when the input device is significantly spaced apart from the computing system (e.g., at a greater distance away from the computing system than the width, diameter, or length of the input device); and ultrasonic transceivers of the input device and/or the computing system can be used to detect and track three-dimensional movement of the input device relative to the computing system or the passive surface when the input device is spaced apart from the computing system (e.g., at a greater distance away from the computing system than the width, diameter, or length of the input device). Signals from any of the sensors discussed herein can be aggregated at the data aggregation of block 1104 and the command performance of block 1106 can be based on signals from any of the sensors discussed herein.

Block 1104 can combine data from specific sensors of the input device and/or the computing system depending on applications being operated by the computing system, possible commands or actions that can be performed by the computing system, and the like. For example, some applications that can be used on the computing system can have a limited number or type of inputs, while other applications that can be used on the computing system can have a more extensive number or type of inputs. As examples, a word processing program operated by the computing system may have a limited number of inputs, such as text inputs that can be generated based on two-dimensional movement of the input device (e.g., mimicking writing on a tracking surface using the input device 102). A video game program operated by the computing system may have a large number of inputs, such as three-dimensional movement inputs, action inputs, and the like that can be generated based on three-dimensional movement of the input device in a Cartesian coordinate system, additional dimensional positioning and movement of the input device (e.g., any combination of a pitch displacement, an absolute pitch angle, a yaw displacement, an absolute yaw angle, a roll displacement, and an absolute roll angle of the input device), user commands input through the input device (e.g., through a force sensor, a button, gestures detected by an IMU, and the like), and the like. An art or presentation program operated by the computing system may have a moderate number of inputs, such as cursor movement inputs that can be generated based on two-dimensional movement of the input device and object rotation inputs that can be generated based on roll displacement and an absolute roll angle of the input device. Any programs or applications operated by the computing system can include any number of inputs that can be supplied based on the detected characteristics of the input device.

At block 1106, the method 1100 can include performing various actions or commands on the computing system based on the aggregated data from block 1104. This can include any of the actions or commands discussed above with respect to FIGS. 1 through 10. The aggregated data can be used to track an expanded number of dimensions, orientations, positioning states, or characteristics of the input device, and can therefore be used to perform an expanded number of actions or commands at the computing system through the input device. For example, this can include moving a cursor, drawing a line, drawing multi-dimensional shapes, painting, zooming in and out, navigating through windows, navigating through multi-dimensional spaces, and any other commands or actions.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An input device comprising:
  a housing comprising:
    an elongate body; and
    a tip portion coupled with the elongate body, the tip portion comprising an opening in a tapered surface between a distal end of the tip portion and the elongate body and radially offset from a radial center of the tip portion;
  a light emitter disposed in the opening of the tip portion, the light emitter configured to emit light through the opening to a surface; and an optical flow sensor disposed in the opening of the tip portion, the optical flow sensor configured to detect two-dimensional movement of the input device relative to the surface.

2. The input device of claim 1, wherein the optical flow sensor is disposed at a radial center of the elongate body.

3. The input device of claim 2, further comprising a transparent spacer disposed between the optical flow sensor and a tip of the tip portion.

4. The input device of claim 1, wherein the light emitter is disposed in the tip portion adjacent to the optical flow sensor.

5. The input device of claim 1, further comprising a force sensor disposed at a tip of the tip portion.

6. The input device of claim 1, further comprising an ultrasonic sensor configured to detect a distance between the input device and an object.

7. The input device of claim 1, further comprising an inertial measurement unit (IMU) configured to detect an orientation of the input device.

8. A system comprising:
  an input device comprising:
    a first sensor configured to detect a position of the input device relative to a surface in at least two dimensions and to produce a first signal based on the position;
    a first electronic component configured to detect an additional characteristic of the position of the input device and to produce a second signal based on the additional characteristic; and
    a haptic feedback device; and
  a computing device in electronic communication with the input device, the computing device comprising:
  a processor configured to:
    perform gesture tracking for the input device based on the second signal, wherein the gesture tracking includes identifying a predetermined pattern; and
    produce a haptic feedback via the haptic feedback device based on a combination of the first signal and the second signal indicating that a movement of the input device reaches a threshold value.

9. The system of claim 8, wherein:
  the input device further comprises a microcontroller coupled to the first sensor and the first electronic component;
  the microcontroller is configured to produce a third signal based on the combination of the first signal and the second signal; and
  the processor is configured to perform the action based on the third signal.

10. The system of claim 8, wherein the first sensor comprises an optical flow sensor.

11. The system of claim 8, wherein:
  the first electronic component comprises an ultrasonic sensor; and
  the additional characteristic is a distance from the surface or the computing device.

12. The system of claim 8, wherein:
  the first electronic component comprises a force sensor; and
  the additional characteristic is a state of contact of the input device with the surface.

13. The system of claim 8, wherein:
  the first electronic component comprises an inertial measurement unit (IMU); and
  the additional characteristic is an angle of the input device.

14. The system of claim 8, wherein:

the first electronic component comprises an inertial measurement unit (IMU);

the additional characteristic is at least one of: a pitch displacement, a pitch angle, a yaw displacement, a yaw angle, a roll displacement, or a roll angle.

15. A computing device, comprising:

a display configured to display a visual user interface element via a display surface;

a processor; and a memory in electronic communication with the processor, the memory comprising electronic instructions encoded thereon which, when executed by the processor, cause the processor to perform a method comprising:

collecting two-dimensional position data relative to a second surface for an input device from an optical flow sensor of the input device, the second surface being separate from the display surface;

collecting additional position data for the input device from a second sensor;

32 combining the two-dimensional position data and the additional position data to produce aggregate position data of the input device relative to the second surface; and performing an action based on the aggregate position data, wherein the action comprises navigating or moving the visual user interface element on the display.

16. The computing device of claim 15, wherein:

the second surface is a tracking surface;

the additional position data comprises detected distance from the second sensor to the tracking surface; and combining the two-dimensional position data and the additional position data comprises correcting the detected movement based on the detected distance to produce the aggregate position data.

17. The computing device of claim 15, wherein the additional position data comprises at least one of: a roll of the input device, a tilt of the input device, a gesture performed with the input device, a three-dimensional position of the input device, or a state of contact of the input device with a surface.

* * * * *